(12) United States Patent
 Shirai

(10) Patent No.: US 12,198,470 B2
(45) Date of Patent: Jan. 14, 2025

(54) SERVER DEVICE, TERMINAL DEVICE, AND DISPLAY METHOD FOR CONTROLLING FACIAL EXPRESSIONS OF A VIRTUAL CHARACTER

(71) Applicant: GREE, Inc., Tokyo (JP)

(72) Inventor: Akihiko Shirai, Tokyo (JP)

(73) Assignee: GREE, INC., Tokyo (JP)

( * ) Notice: Subject to any disclaimer, the term of this patent is extended or adjusted under 35 U.S.C. 154(b) by 461 days.

(21) Appl. No.: 17/351,252

(22) Filed: Jun. 18, 2021

(65) Prior Publication Data

US 2021/0312167 A1    Oct. 7, 2021

Related U.S. Application Data

(63) Continuation of application No. PCT/JP2019/049342, filed on Dec. 17, 2019.

(30) Foreign Application Priority Data

Dec. 18, 2018   (JP) .................. 2018-236543

(51) Int. Cl.
*G06V 40/16*     (2022.01)
*A63F 13/213*    (2014.01)
(Continued)

(52) U.S. Cl.
CPC .......... *G06V 40/174* (2022.01); *A63F 13/213* (2014.09); *A63F 13/2145* (2014.09);
(Continued)

(58) Field of Classification Search
CPC .. G06V 40/174; G06V 40/172; G06V 40/176; A63F 13/2145; A63F 13/215;
(Continued)

(56) References Cited

U.S. PATENT DOCUMENTS 5,647,834 A    7/1997  Ron
9,350,951 B1 * 5/2016  Rowe ..................... G06T 7/66
(Continued)

FOREIGN PATENT DOCUMENTS

JP    10-271470 A    10/1998
JP    2001-126077 A   5/2001
(Continued)

OTHER PUBLICATIONS

Katsunori Nakamura et al., Development of facial image generation system based on hybrid system, Information Processing Society of Japan 81st National Convention, Japan, Information Processing Society of Japan, Mar. 14, 2019, P4-19-20.
(Continued)

*Primary Examiner* — Wesley J Tucker
(74) *Attorney, Agent, or Firm* — XSENSUS LLP

(57) ABSTRACT

A non-transitory computer readable medium storing computer executable instructions which, when executed by processing circuitry, cause the processing circuitry to acquire, from a first sensor, data related to a face of a performer; provide first data, that is generated based on the data, to a classifier; receive, from the classifier, specific facial expression data indicating one specific facial expression among a plurality of predetermined specific facial expressions on the basis of the first data; and select, for display output, a specific facial expression corresponding to the specific facial expression data received from the classifier.

17 Claims, 12 Drawing Sheets

(51) Int. Cl.

| | |
|---|---|
| *A63F 13/2145* | (2014.01) |
| *A63F 13/215* | (2014.01) |
| *A63F 13/424* | (2014.01) |
| *A63F 13/426* | (2014.01) |
| *A63F 13/52* | (2014.01) |
| *G06F 3/0482* | (2013.01) |
| *G06F 3/04845* | (2022.01) |
| *G06F 3/04883* | (2022.01) |
| *G06T 7/20* | (2017.01) |
| *G10L 15/18* | (2013.01) |
| *G10L 15/22* | (2006.01) |
| *G10L 25/63* | (2013.01) |

(52) U.S. Cl.
CPC .......... *A63F 13/215* (2014.09); *A63F 13/424* (2014.09); *A63F 13/426* (2014.09); *A63F 13/52* (2014.09); *G06F 3/0482* (2013.01); *G06F 3/04845* (2013.01); *G06F 3/04883* (2013.01); *G06T 7/20* (2013.01); *G06V 40/172* (2022.01); *G10L 15/18* (2013.01); *G10L 15/22* (2013.01); *G10L 25/63* (2013.01); *G06T 2207/20081* (2013.01); *G06T 2207/30201* (2013.01)

(58) Field of Classification Search
CPC ...... A63F 13/424; A63F 13/655; A63F 13/55; G06F 3/0482; G06F 3/04845; G06F 3/04883; G06F 3/01; G06F 3/16; G06T 7/20; G06T 2207/20081; G06T 2207/30201; G06T 13/40; G10L 15/22; G10L 25/63

See application file for complete search history.

(56) References Cited

U.S. PATENT DOCUMENTS

| | | | |
|---|---|---|---|
| 10,586,368 B2* | 3/2020 | Cao | H04R 27/00 |
| 10,719,968 B2* | 7/2020 | Cao | G06V 40/174 |
| 2006/0290699 A1* | 12/2006 | Dimtrva | H04N 21/4341 |
| | | | 345/473 |
| 2007/0139512 A1 | 6/2007 | Hada et al. | |
| 2008/0301557 A1* | 12/2008 | Kotlyar | G06Q 10/10 |
| | | | 715/733 |
| 2010/0141663 A1* | 6/2010 | Becker | G06T 13/40 |
| | | | 715/764 |
| 2011/0310237 A1 | 12/2011 | Wang et al. | |
| 2013/0235045 A1* | 9/2013 | Corazza | G06V 40/172 |
| | | | 245/473 |
| 2015/0042662 A1* | 2/2015 | Latorre-Martinez | G10L 21/10 |
| | | | 345/473 |
| 2016/0328533 A1 | 11/2016 | Kawai et al. | |
| 2016/0357402 A1* | 12/2016 | Matas | G06T 11/60 |
| 2017/0160813 A1 | 6/2017 | Divakaran et al. | |
| 2017/0311863 A1 | 11/2017 | Matsunaga | |
| 2018/0144761 A1* | 5/2018 | Amini | G06V 20/40 |
| 2018/0336714 A1 | 11/2018 | Stoyles et al. | |
| 2019/0005309 A1* | 1/2019 | Hyun | G06F 3/012 |
| 2019/0215482 A1* | 7/2019 | Sathya | H04N 7/15 |
| 2019/0325633 A1* | 10/2019 | Miller, IV | G06T 13/40 |
| 2020/0265627 A1 | 8/2020 | Seo et al. | |
| 2021/0141663 A1* | 5/2021 | Deshpande | G06N 5/04 |
| 2022/0070385 A1* | 3/2022 | Van Os | H04M 1/72439 |

FOREIGN PATENT DOCUMENTS

| | | |
|---|---|---|
| JP | 2002-315966 A | 10/2002 |
| JP | 2005-323340 A | 11/2005 |
| JP | 2006-71936 A | 3/2006 |
| JP | 2006-202188 A | 8/2006 |
| JP | 2007-256502 A | 10/2007 |
| JP | 2008-299430 A | 12/2008 |
| JP | 2009-153692 A | 7/2009 |
| JP | 2012-59107 A | 3/2012 |
| JP | 2013-020365 A | 1/2013 |
| JP | 2014211719 A | 11/2014 |
| JP | 2017-156854 A | 9/2017 |
| JP | 2018092635 A | 6/2018 |
| JP | 2018-116589 A | 7/2018 |
| WO | 2016/021235 A1 | 2/2016 |

OTHER PUBLICATIONS

Notice of Reasons for Refusal issued in corresponding Japanese application 2020-561452, 6 pp.
International Search Report and Written Opinion dated Jan. 28, 2020, received for PCT Application No. PCT/JP2019/049342, Filed on Dec. 17, 2019, 11 pages including English Translation.
Miyazaki et al., "An expression synthesis in caricaturing", Transactions of the society of Instrument and control engineers, vol. 36, No. 5, May 31, 2000, pp. 448-455.
Kondo et al., "Facial Expression recognition using gabor wavelet in face image", Proceedings of the 1999 IEICE General Conference Foundation and Boundary, Mar. 1999, pp. 341.
Aoshima et al., "Sharing a sense of affinity by emotion view of 600 Thousand People", Proceedings of Interaction, Mar. 11, 2011, 18 pages.
Office Action dated Aug. 30, 2022, in corresponding U.S. Appl. No. 17/077,135, 33 pages.
Advisory Action dated Jan. 20, 2023 in co-pending U.S. Appl. No. 17/077,135, 4 pages.
Office Action dated Jul. 4, 2023, in corresponding Japanese patent Application No. 2022-084302, 6 pages.
Non-final Office Action dated Apr. 10, 2023 in co-pending U.S. Appl. No. 17/077,135, 35 pages.
International Search Report and Written Opinion dated Jun. 16, 2020, corresponding PCT/JP2020/018556, 11 pages.
Office Action dated Feb. 16, 2021, in corresponding Japanese patent Application No. 2019-239318, 8 pages.
Apple Japan Inc., "iPhone X iko de animoji wo tsukau (Using animoji on iPhone X and later)", total 4 pages, Oct. 24, 2018, searched Nov. 12, 2018, [online] URL: https://support.apple.com/ja-jp/HT208190.
Dwango Co., Ltd., "kasutamu kyasuto (custom cast)", total 8 pages, Oct. 3, 2018, searched Nov. 12, 2018, [online] URL: https://customcast.jp/.
Japanese Office Action dated Oct. 25, 2022, in Japanese Patent Application No. 2020-561452, 5 pp.
Non-final Office Action dated Apr. 1, 2022, in U.S. Appl. No. 17/077,135.
Office Action issued on Aug. 10, 2023, in corresponding U.S. Appl. No. 17/077,135, 8 pages.
Japanese Office Action issued Feb. 6, 2024, in corresponding Japanese Patent Application No. 2022-166878, 25 pages.
Toshimitsu Miyajima et al., "Avatar facial expression control method using fundamental frequency and sound pressure in voice chat system", Journal of Human Interface Society, Nov. 25, 2007, vol. 9, No. 4, p. 503-512.
U.S. Advisory Action issued Dec. 6, 2023, in corresponding U.S. Appl. No. 17/077.135, 4 pages.
Office Action issued Mar. 1, 2024, in co-pending U.S. Appl. No. 17/077,135, 35 pages.
Office Action issued on Jul. 4, 2023, in corresponding Japanese patent Application No. 2022-084302, 6 pages.
"Avatar technology for making a big difference in live broadcasting", [online] Dec. 5, 2016, [searched Jun. 27, 2023], Internet <https://technote.qualiarts.jp/article/3>, total 23 pages.
Japanese Office Action issued Apr. 9, 2024, in corresponding Japanese Patent Application No. 2022-166878, 15pp.
Office Action issued May 14, 2024 in Japanese Patent Application No, 2023-077309.
Office Action issued in Jun. 18, 2024 in related Japanese Patent Application No. 2022-166878.
Office Action issued in Oct. 8, 2024 in related Japanese Patent Application No. 2023-077309.

(56) References Cited

OTHER PUBLICATIONS

Office Action issued in Nov. 19, 2024 in related Japanese Patent Application No. 2023-214338.

* cited by examiner

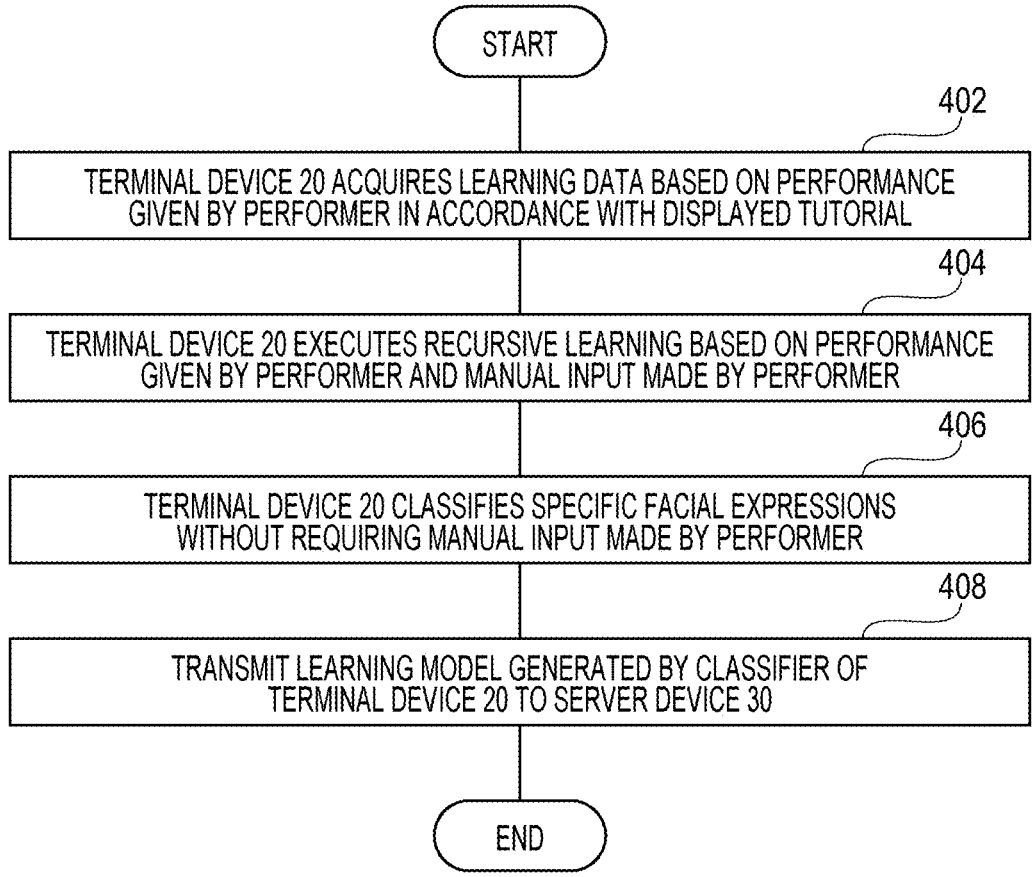
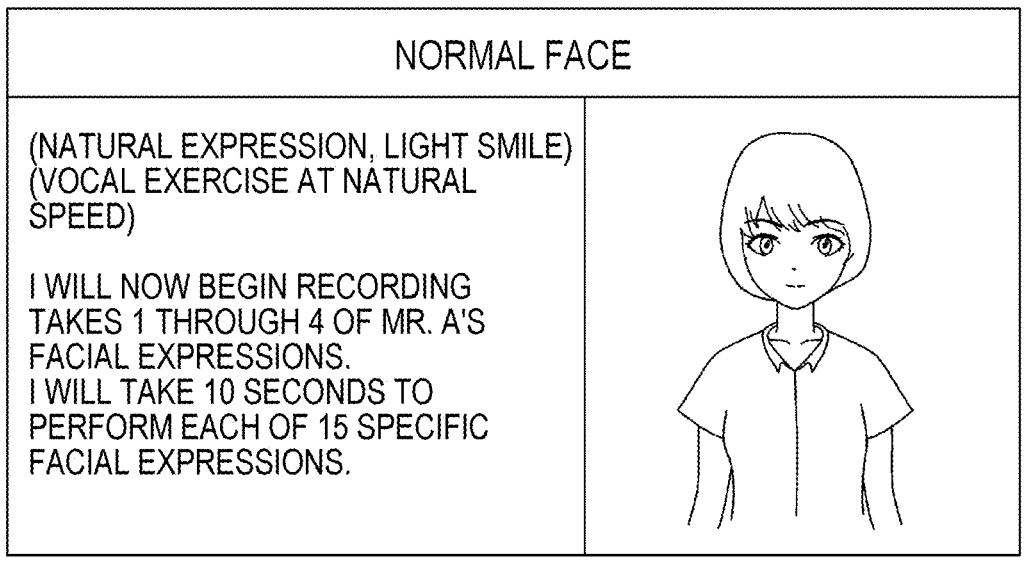

| PLEADING | |
|---|---|
| (UPWARD GLANCE WITH CHIN DOWN)<br><br>ACTUALLY ...<br>I HAVE A FAVOR TO ASK OF MR. A TODAY.<br>I WANT A SPORTS CAR ...<br>(UPWARD GLANCE, LOOKING AT CAMERA) | |

| STAR EYES (EYES WIDE OPEN) | |
|---|---|
| YOU'RE GOING TO BUY IT!?<br>YAY! I CAN PLAY SPADER MAN!<br>YOU'RE SO EASY, MR. A! | |

| FACE WITH CROSS EYES (><) | |
|---|---|
| (100-TON HAMMER DROP!!)<br>OUCH!<br>OW, OW, OUCH ...<br>NICE TIMING ...<br>(HOLD BACK THE PAIN FOR 10 SECONDS) | |

| ANGRY FACE | |
|---|---|
| HEY!<br>WHAT ARE YOU DOING?<br>YOU DON'T THINK YOU CAN GET AWAY WITH DOING THIS TO ME, DO YOU? | |

SERVER DEVICE, TERMINAL DEVICE, AND DISPLAY METHOD FOR CONTROLLING FACIAL EXPRESSIONS OF A VIRTUAL CHARACTER

CROSS-REFERENCE TO RELATED APPLICATIONS

The present application is a bypass continuation of PCT/JP2019/049342, filed Dec. 17, 2019, which claims priority to JP 2018-236543, filed Dec. 18, 2018, and the contents of each are incorporated by reference in their entirety.

TECHNICAL FIELD

The technology disclosed herein relates to a devices and a method for controlling a facial expression of a virtual character displayed in a moving image, a game, or the like on the basis of a facial expression of a user.

BACKGROUND ART

Many services use technology for controlling the facial expression of a virtual character displayed in an application on the basis of the facial expression of a performer. In these services, a user changes their facial expression while looking at a smartphone equipped with a camera that senses a deformation in face shape, thereby being able to change the facial expression of an avatar displayed in a messenger application.

With other services, a user assigns one of multiple prepared facial expressions to each of a plurality of flick directions on the screen of a smartphone. For distribution of a moving image, the user flicks the screen in a direction corresponding to a desired facial expression, thereby being able to make an avatar displayed in the moving image show the facial expression.

SUMMARY

In an exemplary implementation of the present disclosure, a non-transitory computer readable medium stores computer executable instructions which, when executed by processing circuitry, cause the processing circuitry to acquire, from a first sensor, data related to a face of a performer; provide first data, that is generated based on the data, to a classifier; receive, from the classifier, specific facial expression data indicating one specific facial expression among a plurality of predetermined specific facial expressions on the basis of the first data; and select, for display output, a specific facial expression corresponding to the specific facial expression data received from the classifier.

BRIEF DESCRIPTION OF DRAWINGS

FIG. 5 is a flowchart illustrating an example operation performed by a communication system illustrated in FIG. 1.

FIG. 6A is a diagram schematically illustrating an example tutorial displayed on a display unit of the terminal device illustrated in FIG. 1.

DETAILED DESCRIPTION OF THE DRAWINGS

Figure 1:
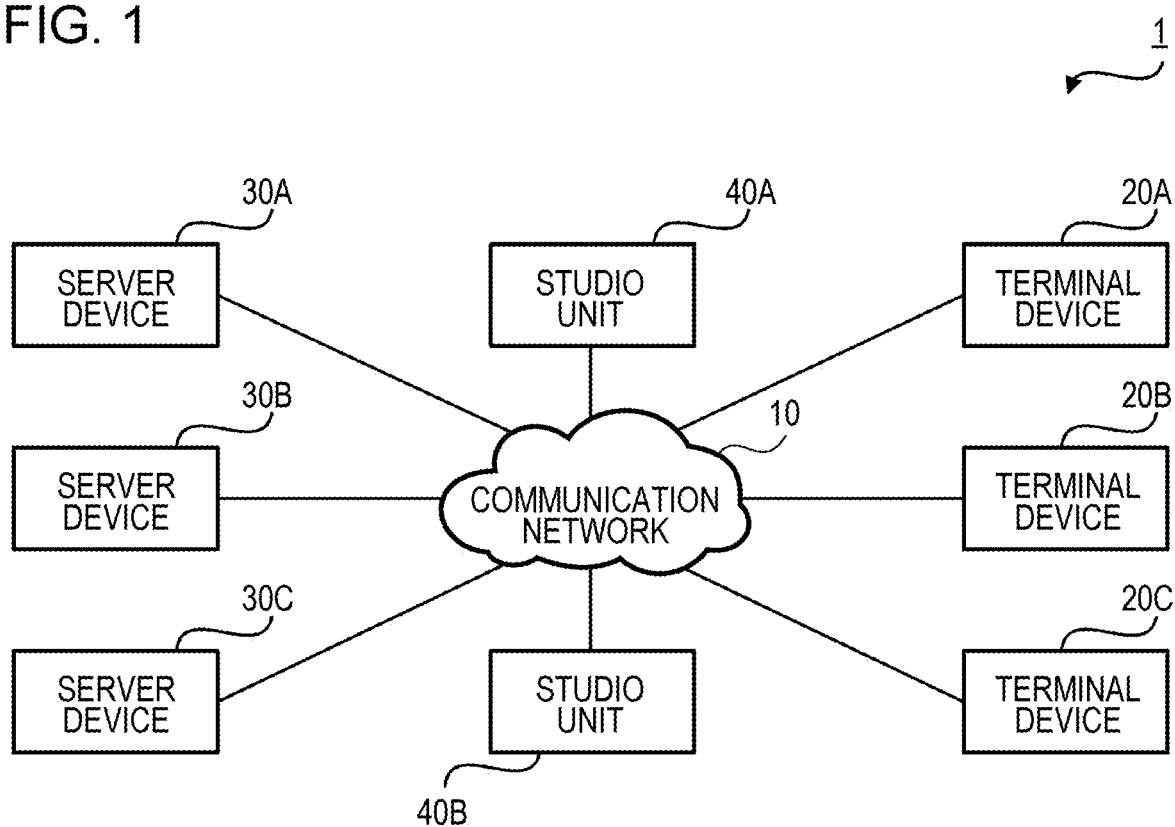
FIG. 1 is a block diagram illustrating an example configuration of a communication system according to an embodiment.

In an application that displays a virtual character (such as an avatar), it is often desirable to make the virtual character show impressive facial expressions. Some examples of such impressive facial expressions are as follows (but are not limited to this list). A first example is a facial expression in which the face shape is unrealistically deformed like that of a cartoon, such as a facial expression with the eyes protruding from the face. A second example is a facial expression in which the face is given a symbol, a shape, and/or a color, such as a facial expression with tears dropping, a facial expression with a red face, and an angry facial expression with triangular eyes. A third example includes facial expressions that express emotions including pleasure, anger, sorrow, and joy.

The inventors have recognized limitations in conventional technology with respect to displaying a virtual character showing such facial expressions. For example, when services use technology that tracks the facial expressions of a user, it may not be possible to reflect in the facial expression of the virtual character a facial expression that is difficult for the face of the user to actually have (e.g. eyes popping out of head). Also, when services use technology in which a user flicks the screen in a direction corresponding to a desired facial expression, it is necessary for the user to recognize all the prepared facial expressions on the display. Because of this, a total number of facial expressions that can be assigned to the flick directions at one time is limited in number. The inventors have developed the new devices and methods discussed in this disclosure for controlling a facial expression of a virtual character based on of a facial expression of a user.

In accordance with an exemplary implementation of the present disclosure, a computer program executed by a processor causes the processor to function to: acquire, from a first sensor, data related to a face of a performer; input first data generated based on the data to a classifier, and output, from the classifier, specific facial expression data indicating one specific facial expression among a plurality of predetermined specific facial expressions on the basis of the first data; and select a specific facial expression corresponding to the specific facial expression data output from the classifier, as a specific facial expression to be displayed.

In accordance with an exemplary implementation of the present disclosure, a display method executable by a processor configured to execute computer-readable instructions, the processor executing the instructions to perform the display method, the display method including acquiring, from a first sensor, data related to a face of a performer; inputting first data generated based on the data to a classifier, and outputting, from the classifier, specific facial expression data indicating one specific facial expression among a plurality of predetermined specific facial expressions on the basis of the first data; and selecting a specific facial expression corresponding to the specific facial expression data output from the classifier, as a specific facial expression to be displayed.

In accordance with an exemplary implementation of the present disclosure, a terminal device includes a processor, the processor being configured to execute computer-readable instructions to acquire, from a first sensor, data related to a face of a performer; input first data generated based on the data to a classifier, and output, from the classifier, specific facial expression data indicating one specific facial expression among a plurality of predetermined specific facial expressions on the basis of the first data; and select a specific facial expression corresponding to the specific facial expression data output from the classifier, as a specific facial expression to be displayed.

In accordance with an exemplary implementation of the present disclosure, a server device includes a processor, the processor being configured to execute computer-readable instructions to receive, from a first sensor, data related to a face of a performer; input first data generated based on the data to a classifier, and output, from the classifier, specific facial expression data indicating one specific facial expression among a plurality of predetermined specific facial expressions on the basis of the first data; and select a specific facial expression corresponding to the specific facial expression data output from the classifier, as a specific facial expression to be displayed.

In accordance with an exemplary implementation of the present disclosure, a computer program executed by a processor causes the processor to function to acquire, from a second sensor, audio data related to speech and/or singing sounds produced by a performer; input second data generated based on the audio data to a classifier, and output, from the classifier, specific facial expression data indicating one specific facial expression among a plurality of predetermined specific facial expressions on the basis of the second data; and select a specific facial expression corresponding to the specific facial expression data output from the classifier, as a specific facial expression to be displayed.

In accordance with an exemplary implementation of the present disclosure, a display method executable by a processor configured to execute computer-readable instructions, the processor executing the instructions to perform the display method, the display method including acquiring, from a second sensor, audio data related to speech and/or singing sounds produced by a performer; inputting second data generated based on the audio data to a classifier, and outputting, from the classifier, specific facial expression data indicating one specific facial expression among a plurality of predetermined specific facial expressions on the basis of the second data; and selecting a specific facial expression corresponding to the specific facial expression data output from the classifier, as a specific facial expression to be displayed.

In accordance with an exemplary implementation of the present disclosure, a terminal device includes a processor, the processor being configured to execute computer-readable instructions to acquire, from a second sensor, audio data related to speech and/or singing sounds produced by a performer; input second data generated based on the audio data to a classifier, and output, from the classifier, specific facial expression data indicating one specific facial expression among a plurality of predetermined specific facial expressions on the basis of the second data; and select a specific facial expression corresponding to the specific facial expression data output from the classifier, as a specific facial expression to be displayed.

In accordance with an exemplary implementation of the present disclosure, a server device includes a processor, the processor being configured to execute computer-readable instructions to acquire, from a second sensor, audio data related to speech and/or singing sounds produced by a performer; input second data generated based on the audio data to a classifier, and output, from the classifier, specific facial expression data indicating one specific facial expression among a plurality of predetermined specific facial expressions on the basis of the second data; and select a specific facial expression corresponding to the specific facial expression data output from the classifier, as a specific facial expression to be displayed.

The following describes various embodiments of the present disclosure with reference to the accompanying drawings. In the drawings, common components are denoted by the same reference numerals. It should be noted that components expressed in a certain figure may be omitted in another figure for convenience of illustration. It should also be noted that the accompanying drawings may not be drawn to exact scale.

1. Example of Communication System

FIG. 1 is a block diagram illustrating an example configuration of a communication system according to an embodiment. As illustrated in FIG. 1, a communication system 1 can include one or more terminal devices 20 connected to a communication network 10, and one or more server devices 30 connected to the communication network 10. In FIG. 1, three terminal devices 20A to 20C are illustrated as an example of the terminal device(s) 20, and three server devices 30A to 30C are illustrated as an example of the server device(s) 30. However, one or more other terminal devices 20 may be connected to the communication network 10 as the terminal device(s) 20, and one or more other server devices 30 may be connected to the communication network 10 as the server device(s) 30.

The communication system 1 can also include one or more studio units 40 connected to the communication network 10. In FIG. 1, two studio units 40A and 40B are illustrated as an example of the studio unit(s) 40. However, one or more other studio units 40 may be connected to the communication network 10 as the studio unit(s) 40.

In a "first aspect", in the communication system 1 illustrated in FIG. 1, the terminal device 20 (e.g., the terminal device 20A) that is operated by a performer and executes a predetermined application (such as a moving image distribution application) can acquire data related to the face of the performer facing the terminal device 20A and/or audio data related to speech and/or singing sounds produced by the performer. Further, the terminal device 20 can transmit a moving image of a virtual character whose facial expression is changed in accordance with the acquired data to the server device 30 (e.g., the server device 30A) via the communication network 10. Further, the server device 30A can distribute the moving image of the virtual character, which is received from the terminal device 20A, via the communication network 10 to one or more other terminal devices 20 that have executed a predetermined application (such as a moving-image viewing application) and transmitted a request to distribute the moving image.

In a "second aspect", in the communication system 1 illustrated in FIG. 1, for example, the server device 30 (e.g., the server device 30B) installed in a studio or the like or any other location can acquire data related to the face of a performer in the studio or the like or any other location described above and/or audio data related to speech and/or singing sounds produced by the performer. Further, the server device 30 can distribute a moving image of a virtual character whose facial expression is changed in accordance with the acquired data, via the communication network 10, to one or more terminal devices 20 that have executed a predetermined application (such as a moving-image viewing application) and transmitted a request to distribute the moving image.

In a "third aspect", in the communication system 1 illustrated in FIG. 1, for example, the studio unit 40 installed in a studio or the like or any other location can acquire data related to the face of a performer in the studio or the like or any other location described above and/or audio data related to speech and/or singing sounds produced by the performer. Further, the studio unit 40 can generate a moving image of a virtual character whose facial expression is changed in accordance with this data and transmit the moving image to the server device 30. Further, the server device 30 can distribute the moving image acquired (received) from the studio unit 40, via the communication network 10, to one or more terminal devices 20 that have executed a predetermined application (such as a moving-image viewing application) and transmitted a request to distribute the moving image.

The communication network 10 can include, without limitation, a mobile phone network, a wireless LAN, a fixed telephone network, the Internet, an intranet, Ethernet (registered trademark), and/or the like.

The terminal device 20 executes a specific application installed therein, thereby being able to execute the operation or the like of acquiring data related to the face of the performer and/or audio data related to speech and/or singing sounds produced by the performer. Further, the terminal device 20 can execute the operation or the like of transmitting a moving image of a virtual character whose facial expression is changed in accordance with the acquired data to the server device 30 via the communication network 10. Alternatively, the terminal device 20 can execute a web browser installed therein to receive and display a web page from the server device 30 to execute a similar operation.

The terminal device 20 is any terminal device capable of performing such operations and can include, without limitation, a smartphone, a tablet, a mobile phone (feature phone), a personal computer, and/or the like.

In the "first aspect", the server device 30 executes a specific application installed therein, thereby being able to function as an application server. Accordingly, the server device 30 can execute the operation or the like of receiving a moving image of a virtual character from each terminal device 20 via the communication network 10, and distributing the received moving image (together with other moving images) to each terminal device 20 via the communication network 10. Alternatively, the server device 30 executes a specific application installed therein to function as a web server, thereby being able to execute a similar operation via a web page that is transmitted to each terminal device 20.

In the "second aspect", the server device 30 executes a specific application installed therein, thereby being able to function as an application server. Accordingly, the server device 30 can execute the operation or the like of acquiring data related to the face of a performer in a studio or the like or any other location where the server device 30 is installed and/or audio data related to speech and/or singing sounds produced by the performer. Further, the server device 30 can execute the operation or the like of distributing a moving image of a virtual character whose facial expression is changed in accordance with the acquired data (together with other moving images) to each terminal device 20 via the communication network 10. Alternatively, the server device 30 executes a specific application installed therein to function as a web server, thereby being able to execute a similar operation via a web page that is transmitted to each terminal device 20. Further, the server device 30 executes a specific application installed therein, thereby being able to function as an application server. Accordingly, the server device 30 can execute the operation or the like of acquiring (receiving), from the studio unit 40 installed in a studio or the like or any other location, a moving image of a virtual character whose facial expression is changed in accordance with data related to the face of a performer in the studio or the like and/or audio data related to speech and/or singing sounds produced by the performer. Further, the server device 30 can execute the operation or the like of distributing the moving image to each terminal device 20 via the communication network 10.

The studio unit 40 can function as an information processing device that executes a specific application installed therein. Accordingly, the studio unit 40 can acquire data related to the face of a performer in a studio or the like or any other location where the studio unit 40 is installed and/or audio data related to speech and/or singing sounds produced by the performer. Further, the studio unit 40 can transmit a moving image of a virtual character whose facial expression is changed in accordance with the acquired data (together with other moving images) to the server device 30 via the communication network 10.

2. Hardware Configurations of Devices

Next, an example hardware configuration of each terminal device 20 and each server device 30 will be described.

2-1. Hardware Configuration of Terminal Device 20

Figure 2:
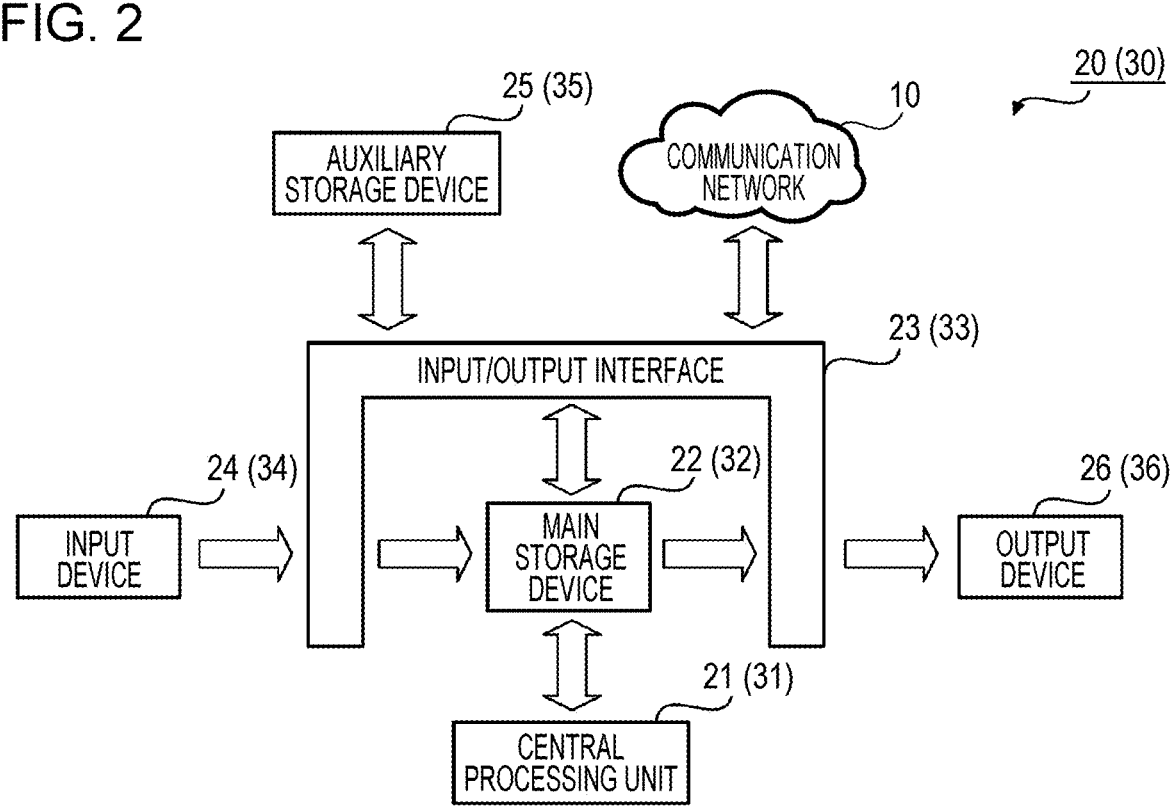
FIG. 2 is a block diagram schematically illustrating an example hardware configuration of a terminal device illustrated in FIG. 1.

An example hardware configuration of each terminal device 20 will be described with reference to FIG. 2. FIG. 2 is a block diagram schematically illustrating an example hardware configuration of the terminal device 20 (the server device 30) illustrated in FIG. 1 (in FIG. 2, reference numerals in parentheses are those described in relation to each server device 30, as described below)

As illustrated in FIG. 2, each terminal device 20 can mainly include a central processing unit 21, a main storage device 22, an input/output interface device 23, an input device 24, an auxiliary storage device 25, and an output device 26. These devices are connected to each other via a data bus and/or a control bus.

The central processing unit 21 is referred to as a "CPU" and is configured to perform computation on instructions and data stored in the main storage device 22 and store the results of the computation in the main storage device 22. The functionality central processing unit 21 as well as other components of terminal device 20 as discussed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Furthermore, as used herein the terms "circuit" or "circuitry" means one or more circuits, including discrete circuit(s) as well as circuit board(s) and combinations thereof. The central processing unit 21 may be encompassed by or is a component of control circuitry and/or processing circuitry.

Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The central processing unit 21 can control the input device 24, the auxiliary storage device 25, the output device 26, and so forth via the input/output interface device 23. The terminal device 20 can include one or more such central processing units 21.

The main storage device 22 is referred to as a "memory" and is configured to store instructions and data received from the input device 24, the auxiliary storage device 25, the communication network 10, and so forth (such as the server device 30) via the input/output interface device 23 and the results of the computation of the central processing unit 21. In an exemplary implementation, auxiliary storage device 22 is a non-transitory computer readable medium that stores computer executable instructions for execution by central processing unit 21. The main storage device 22 can include, without limitation, a RAM (random access memory), a ROM (read-only memory), a flash memory, and/or the like.

The auxiliary storage device 25 is a storage device having a larger capacity than the main storage device 22. In an exemplary implementation, auxiliary storage device 25 is a non-transitory computer readable medium that stores computer executable instructions for execution by central processing unit 21. The auxiliary storage device 25 stores the instructions and data (computer programs) constituting the specific application, the web browser, and so forth described above, and is controlled by the central processing unit 21 to transmit these instructions and data (computer programs) to the main storage device 22 via the input/output interface device 23. The auxiliary storage device 25 can include, without limitation, a magnetic disk device, an optical disk device, and/or the like.

The input device 24 is a device that captures data from the outside, and includes, without limitation, a touch panel, a button, a keyboard, a mouse, a sensor, and/or the like. As described below, the sensor can include, without limitation, a first sensor including one or more cameras or the like, and/or a second sensor including one or more microphones or the like.

The output device 26 can include, without limitation, a display device, a touch panel, a printer device, and/or the like.

In this hardware configuration, the central processing unit 21 sequentially loads instructions and data (computer program) constituting a specific application stored in the auxiliary storage device 25 into the main storage device 22, and computes the loaded instructions and data, thereby being able to control the output device 26 via the input/output interface device 23 or transmit and receive various kinds of information to and from other devices (such as the server device 30 and any other terminal device 20) via the input/output interface device 23 and the communication network 10.

Accordingly, the terminal device 20 executes a specific application installed therein, thereby being able to execute the operation or the like (including various operations described in detail below) of acquiring data related to the face of the performer and/or audio data related to speech and/or singing sounds produced by the performer and transmitting a moving image of a virtual character whose facial expression is changed in accordance with the acquired data to the server device 30 via the communication network 10. Alternatively, the terminal device 20 executes a web browser installed therein to receive and display a web page from the server device 30, thereby being able to execute a similar operation.

The terminal device 20 may include one or more microprocessors and/or graphics processing units (GPUs) instead of the central processing unit 21 or together with the central processing unit 21.

2-2. Hardware Configuration of Server Device 30

An example hardware configuration of each server device 30 will be described also with reference to FIG. 2. As the hardware configuration of each server device 30, for example, the same hardware configuration as that of each terminal device 20 described above can be used. Accordingly, reference numerals given to the components of each server device 30 are presented in parentheses in FIG. 2.

As illustrated in FIG. 2, each server device 30 can mainly include a central processing unit 31, a main storage device 32, an input/output interface device 33, an input device 34, an auxiliary storage device 35, and an output device 36. These devices are connected to each other via a data bus and/or a control bus. The central processing unit 31 may be encompassed by or is a component of control circuitry and/or processing circuitry.

The central processing unit 31, the main storage device 32, the input/output interface device 33, the input device 34, the auxiliary storage device 35, and the output device 36 can be substantially the same as the central processing unit 21, the main storage device 22, the input/output interface device 23, the input device 24, the auxiliary storage device 25, and the output device 26 included in each terminal device 20 described above, respectively.

In this hardware configuration, the central processing unit 31 sequentially loads instructions and data (computer program) constituting a specific application stored in the auxiliary storage device 35 into the main storage device 32, and computes the loaded instructions and data, thereby being able to control the output device 36 via the input/output interface device 33 or transmit and receive various kinds of information to and from other devices (such as each terminal device 20) via the input/output interface device 33 and the communication network 10.

Accordingly, in the "first aspect", the server device 30 executes a specific application installed therein, thereby being able to function as an application server. Accordingly, the server device 30 can execute the operation or the like (including various operations described in detail below) of receiving a moving image of a virtual character from each terminal device via the communication network 10 and distributing the received moving image (together with other moving images) to each terminal device 20 via the communication network 10. Alternatively, the server device 30 executes a specific application installed therein to function as a web server, thereby being able to execute a similar operation via a web page that is transmitted to each terminal device 20.

In the "second aspect", the server device 30 executes a specific application installed therein, thereby being able to function as an application server. Accordingly, the server device 30 can execute the operation or the like of acquiring data related to the face of a performer in a studio or the like or any other location where the server device 30 is installed and/or audio data related to speech and/or singing sounds produced by the performer. In addition, the server device 30 can execute the operation or the like (including various operations described in detail below) distributing a moving image of a virtual character whose facial expression is changed in accordance with the acquired data (together with other moving images) to each terminal device 20 via the communication network 10. Alternatively, the server device 30 executes a specific application installed therein to function as a web server, thereby being able to execute a similar operation via a web page that is transmitted to each terminal device 20.

In the "third aspect", the server device 30 executes a specific application installed therein, thereby being able to function as an application server. Accordingly, the server device 30 can execute the operation or the like of acquiring (receiving) a moving image of a virtual character whose facial expression is changed in accordance with data related to the face of a performer in a studio or the like or any other location where the studio unit 40 is installed and/or audio data related to speech and/or singing sounds produced by the performer from the studio unit 40 via the communication network 10 (together with other moving images). Furthermore, the server device 30 can also execute the operation or the like (including various operations described in detail below) of distributing this image to each terminal device 20 via the communication network 10.

The server device 30 may include one or more microprocessors and/or graphics processing units (GPUs) instead of the central processing unit 31 or together with the central processing unit 31.

2-3. Hardware Configuration of Studio Unit 40

The studio unit 40 can be implemented by an information processing device such as a personal computer and can mainly include, like the terminal device 20 and the server device described above, a central processing unit, a main storage device, an input/output interface device, an input device, an auxiliary storage device, and an output device. These devices are connected to each other via a data bus and/or a control bus.

The studio unit 40 executes a specific application installed therein, thereby being able to function as an information processing device. Accordingly, the studio unit 40 can acquire data related to the face of a performer in a studio or the like or any other location where the studio unit 40 is installed and/or audio data related to speech and/or singing sounds produced by the performer. Further, the studio unit 40 can transmit a moving image of a virtual character whose facial expression is changed in accordance with the acquired data (together with other moving images) to the server device 30 via the communication network 10.

3. Functions of Devices

Next, example functions of each terminal device 20 and each server device 30 will be described.

3-1. Functions of Terminal Device 20

Figure 3:
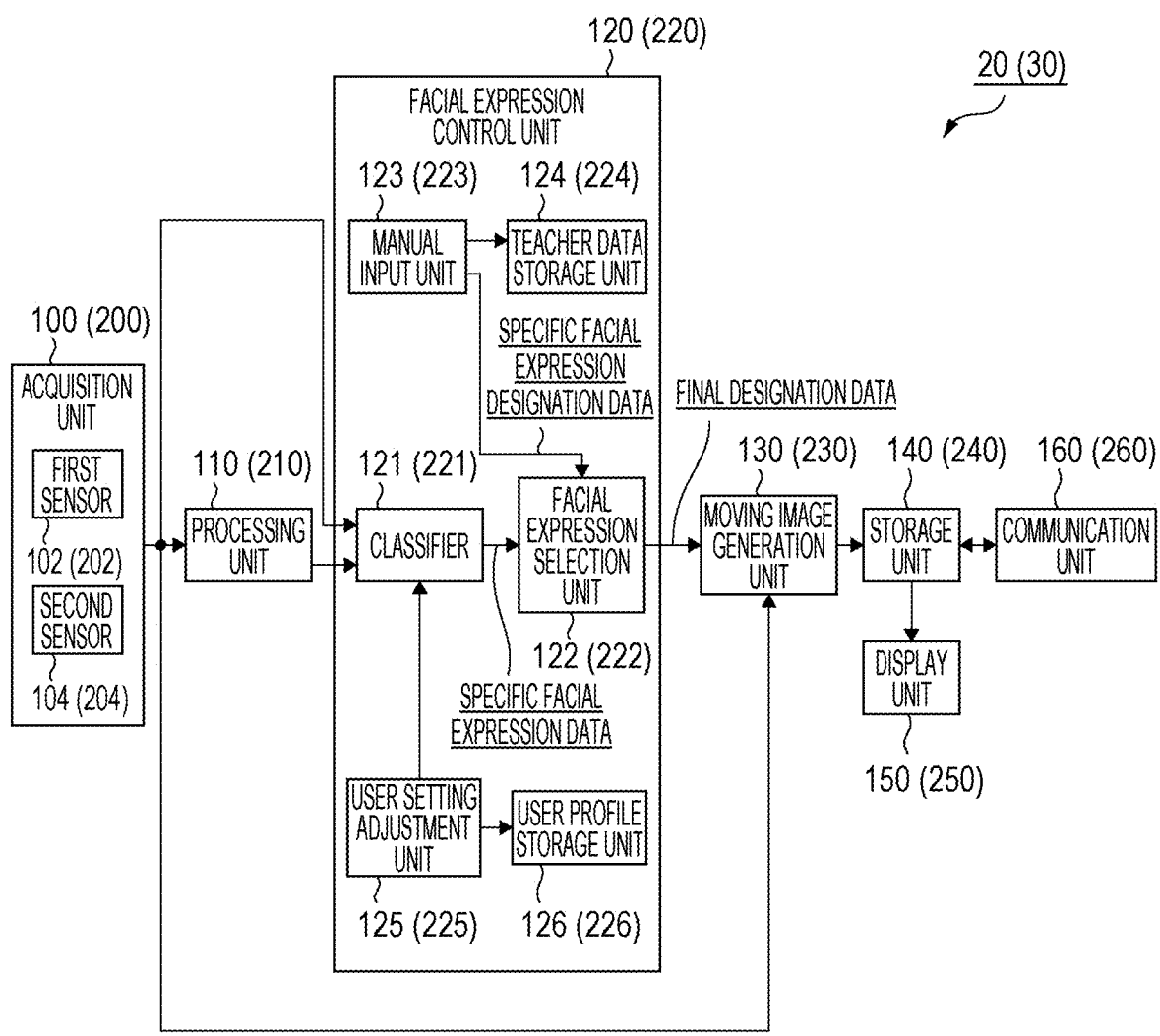
FIG. 3 is a block diagram schematically illustrating example functions of the terminal device illustrated in FIG. 1.

Example functions of the terminal device 20 will be described with reference to FIG. 3. FIG. 3 is a block diagram schematically illustrating example functions of the terminal device 20 (the server device 30) illustrated in FIG. 1 (in FIG. 3, reference numerals in parentheses are described in relation to the server device 30, as described below).

As illustrated in FIG. 3, the terminal device 20 can include an acquisition unit 100 that acquires, from a sensor, data related to the face of a performer and/or audio data related to speech and/or singing sounds produced by the performer, a processing unit 110 that executes various computational operations on the data acquired by the acquisition unit 100 to generate first data and/or second data, and a facial expression control unit 120 that selects, based on the first data and/or the second data generated by the processing unit 110, any specific facial expression among a plurality of predetermined specific facial expressions as a specific facial expression to be displayed.

The terminal device 20 can further include a moving image generation unit 130 that generates a moving image (animated image) of a virtual character on the basis of the specific facial expression selected by the facial expression control unit 120, a storage unit 140 that stores the moving image generated by the moving image generation unit 130, a display unit 150 that displays the moving image or the like stored in the storage unit 140, and a communication unit 160 that transmits the moving image or the like stored in the storage unit 140 to the server device 30 via the communication network 10.

As discussed with respect to FIG. 2, terminal device 20 and server device 30 include processing circuitry. The functionality of each of the components of terminal device 20 and server device 30, such as acquisition unit 100/200, processing unit 110/210, facial expression control unit 120/220, moving image generation unit 130/230, storage unit 140/240, display unit 150/250 and communication unit 160/260 as well as their sub-components to be discussed later, may be implemented using circuitry or processing circuitry. Each component and/or sub-component may be encompassed by or is a component of control circuitry and/or processing circuitry. (1) Acquisition Unit 100

The acquisition unit 100 can include one or more first sensors 102 that acquire data related to the face of a performer, and one or more second sensors 104 that acquire audio data related to speech and/or singing sounds produced by the performer.

In an embodiment, the first sensor 102 can include an RGB camera that captures visible light, and a near-infrared camera that captures near-infrared light. Examples of the camera can include the one included in the iPhone X (registered trademark) TrueDepth camera. The second sensor 104 can include a microphone that records audio.

First, with respect to the first sensor 102, the acquisition unit 100 captures an image of the face of a performer using the first sensor 102, which is positioned near the face of the performer. This allows the acquisition unit 100 to generate data (e.g., an MPEG file) in which an image acquired by the RGB camera is recorded over a unit time in association with a time code. The time code is a code indicating a time at which the image is acquired. Further, the acquisition unit 100 can generate data in which a predetermined number of numerical values indicating depths acquired by the near-infrared camera are recorded over a unit time in association with the time code described above. The predetermined number is, for example, 51. The numerical values indicating depths are, for example, floating-point numerical values. The data generated by the acquisition unit 100 is, for example, a TSV file. The TSV file is a file in a format in which a plurality of pieces of data are recorded with the pieces of data being separated with tabs.

With respect to the near-infrared camera, specifically, a dot projector emits an infrared laser beam including a dot (point) pattern onto the face of the performer, and the near-infrared camera captures infrared dots projected onto and reflected from the face of the performer and generates an image of the captured infrared dots. The acquisition unit 100 compares an image of a dot pattern emitted by the dot projector, which is registered in advance, with the image captured by the near-infrared camera. This allows the acquisition unit 100 to calculate the depth of each point using a shift in position at each point between the two images. The points described above may be referred to as feature points. The number of points in the two images is, for example, 51. The depth of a point is the distance between the point and the near-infrared camera. The acquisition unit 100 can generate data in which the numerical values indicating the depths calculated in this way are recorded over a unit time in association with a time code in the manner described above.

Next, with respect to the second sensor 104, the acquisition unit 100 acquires voice related to speech and/or singing sounds produced by the performer using the second sensor 104 arranged near the performer. This allows the acquisition unit 100 to generate data (e.g., an MPEG file) recorded over a unit time in association with a time code. In one embodiment, the acquisition unit 100 can acquire data related to the face of a performer using the first sensor 102 and also acquire audio data related to speech and/or singing sounds produced by the performer using the second sensor 104. In this case, the acquisition unit 100 can generate data recorded over a unit time in association with the same time code on the basis of an image acquired by the RGB camera and audio data related to speech and/or singing sounds produced by the performer using the second sensor 104. The data to be generated is, for example, an MPEG file.

The acquisition unit 100 can output the data (such as an MPEG file and a TSV file) related to the face of the performer and/or the audio data (such as an MPEG file) related to speech and/or singing sounds produced by the performer, which are generated in the way described above, to the processing unit 110, a classifier 121, and/or the moving image generation unit 130.

While the description has been given of a case where the first sensor 102 includes an RGB camera and an infrared camera, the first sensor 102 may include, for example, one of (A), (B), and (C) as follows:

(A) a camera that detects infrared light emitted by an infrared laser and reflected from the face of a performer;

(B) a plurality of RGB cameras that capture visible light; and (C) a single camera that captures visible light.

In the case of (A) above, the acquisition unit 100 can calculate the depth of each feature point on the face of the performer by using a method similar to that described above. In the case of (B) above, the acquisition unit 100 can compute the depth (depth) of each feature point on the face of the performer by using a plurality of images captured by the plurality of RGB cameras. In the case of (C) above, the acquisition unit 100 can calculate the depth (depth) of each feature point on the face of the performer from an image captured by the single camera by using deep learning or the like. In the case of (C) above, alternatively, the acquisition unit 100 may calculate the depth (depth) of each feature point on the face of the performer through analysis processing (such as image processing) performed on an image captured by the single camera.

(2) Processing Unit 110

The processing unit 110 can generate first data on the basis of the data related to the face of the performer, which is acquired by the acquisition unit 100. The processing unit 110 can further generate second data on the basis of the audio data related to speech and/or singing sounds produced by the performer, which is acquired by the acquisition unit 100.

Specifically, first, with respect to the first data, the processing unit 110 can calculate, for each feature point on the face of the performer, the amount of movement of the feature point in the temporal direction using the data received from the acquisition unit 100. The data received from the acquisition unit 100 may include, for example, a TSV file and time codes associated with the TSV file. The amount of movement of the feature point described above in the temporal direction may be the amount of movement of the feature point described above within a predetermined time interval. Data indicating the amounts of movement of the respective feature points in the temporal direction, which are calculated in the way described above, can be generated as the first data.

With respect to the second data, the processing unit 110 can calculate, using the audio data received from the acquisition unit 100, for example, an MPEG file and time codes associated with the MPEG file, data related to loudness, sound pressure, speech rate, formant, and/or the like at each time. Instead of or in addition to this, the processing unit 100 executes natural language processing using the audio data received from the acquisition unit 100, thereby being able to execute a word, a word ending, an exclamation, and/or the like at each time from the audio data. The audio data received from the acquisition unit 100 may include, for example, an MPEG file and time codes associated with the MPEG file. The processing unit 100 can generate data indicating the extracted word, word ending, exclamation, and/or the like as the second data.

The processing unit 110 can output the first data and/or the second data, which is generated in the way described above, to (the classifier 121 of) the facial expression control unit 120.

(3) Facial Expression Control Unit 120

As illustrated in FIG. 3, the facial expression control unit 120 can mainly include the classifier 121, a facial expression selection unit 122, a manual input unit 123, a teacher data storage unit 124, a user setting adjustment unit 125, and a user profile storage unit 126.

The classifier 121 is configured to generate output data corresponding to input data. The classifier 121 is given in advance teacher data (target) corresponding to the input data, and can compare output data corresponding to the input data with the teacher data and create or change rules so that the two have the same value. The classifier 121 can be created using, for example, a programming language such as Python. The classifier 121 may generate a learning model (trained model). The learning model (trained model) generated by the classifier 121 includes an algorithm (program) capable of classifying the input data, and various parameters (data sets). The classifier 121 may be an artificial intelligence.

In one embodiment, the classifier 121 receives input of at least one of the following pieces of data: the first data and the second data (received from the processing unit 110); and the data related to the face of the performer and the audio data related to speech and/or singing sounds produced by the performer (received from the acquisition unit 100). This allows the classifier 121 to output data ("specific facial expression data") indicating any specific facial expression among a plurality of predetermined specific facial expressions to the facial expression selection unit 122. The details of the classifier 121 will be described below.

The manual input unit 123 receives input of "specific facial expression designation data" from a performer who is performing while viewing a moving image displayed on the display unit 150, via a user interface such as a touch panel, a button, and a keyboard. The "specific facial expression designation data" is data that designates, for the facial expression of the virtual character currently displayed on the display unit 150, any facial expression among a plurality of predetermined specific facial expressions as a facial expression to be displayed on the display unit 150. The manual input unit 123 outputs the specific display designation data to the facial expression selection unit 122.

Further, the manual input unit 123 can store this specific display designation data in the teacher data storage unit 124 as teacher data (target) for the first data and/or the second data corresponding to the point in time when the specific facial expression designation data is input from the performer.

The facial expression selection unit 122 can select, based on data including the specific display designation data from the manual input unit 123, the specific facial expression data from the classifier 121, and the like, any specific facial expression among the plurality of predetermined specific facial expressions as a facial expression to be displayed in the moving image. For example, the facial expression selection unit 122 can select a specific facial expression corresponding to the specific facial expression data from the classifier 121 as a facial expression to be displayed in the moving image. On the other hand, in some cases, no specific facial expression is designated in the specific facial expression data from the classifier 121. For example, "other facial expressions" or the like may be designated since none of the plurality of predetermined specific facial expressions is applicable. In this case, the facial expression selection unit 122 can select any other facial expression as a facial expression to be displayed in the moving image.

However, even if specific facial expression data is output from the classifier 121 in response to the first data and/or the second data, the facial expression selection unit 122 may receive specific facial expression designation data from the performer via the manual input unit 123 in response to the first data and/or the second data. In this case, the facial expression selection unit 122 can select a specific facial expression corresponding to the specific facial expression designation data as a facial expression to be displayed in the moving image. The facial expression selection unit 122 outputs data indicating the finally selected specific facial expression (or other facial expressions) to the moving image generation unit 130. This data is hereinafter referred to sometimes as "final designation data". The details of the algorithm to be used by the facial expression selection unit 122 will be described below.

The user setting adjustment unit 125 can apply the teacher data corresponding to the first data and/or the second data, which is stored in the teacher data storage unit 124, to the classifier 121. Further, the user setting adjustment unit 125 can store the learning model (model that has been trained) generated by the classifier 121 in the user profile storage unit 126 as a learning model for the performer. The user setting adjustment unit 125 can further store a learning model (trained model) prepared in advance, which is received from the server device 30 via the communication network 10, in the user profile storage unit 126, and then read the learning model (trained model) from the user profile storage unit 126 and apply it to the classifier 121.

(4) Moving Image Generation Unit 130, Storage Unit 140, Display Unit 150, and Communication Unit 160

The moving image generation unit 130 can generate a moving image of a virtual character on the basis of data indicating the finally selected specific facial expression ("final designation data") from the facial expression selection unit 122, the data related to the face of a performer and/or the audio data related to speech and/or singing sounds produced by the performer from the acquisition unit 100, and the like. The moving image of the virtual character itself can be generated by the moving image generation unit 130 causing a rendering unit to perform rendering using various kinds of information (such as geometry information, bone information, texture information, shader information, and blend shape information) stored in a character data storage unit. Accordingly, a moving image of the virtual character can be generated. The character data storage unit and the rendering unit may be included in the moving image generation unit 130 or may be external to the moving image generation unit 130.

For example, if the "final designation data" from the facial expression selection unit 122 designates a specific facial expression, the moving image generation unit 130 can generate a moving image in which the facial expression of the virtual character is changed using the designated facial expression.

On the other hand, if the "final designation data" from the facial expression selection unit 122 designates other facial expressions, the moving image generation unit 130 can generate a moving image in which the facial expression of the virtual character is changed using data related to the face of the performer from the acquisition unit 100 (data related to the depths of the respective feature points on the face of the performer) (e.g., a moving image in which the facial expression of the virtual character changes in synchronization with the movement of the mouth and the eyes of the performer, that is, a moving image in which the facial expression of the virtual character changes in a lip-sync and eye-tracking manner with movement of the face of the performer).

The moving image generation unit 130 can store a file (e.g., an MPEG file or any other file) containing the generated moving image in the storage unit 140.

The display unit 150 includes, for example, a touch panel, a display, and so forth and can display the file containing the moving image stored in the storage unit 140.

The communication unit 160 can transmit the file containing the moving image stored in the storage unit 140 to the server device 30 via the communication network 10. The communication unit 160 can further receive a learning model (trained model) generated in advance, which is received from the server device 30 via the communication network 10, and store the learning model (trained model) in the storage unit 140 and/or the user profile storage unit 126.

The operation of the units described above can be implemented by the terminal device of the performer in response to a predetermined application (e.g., a moving image distribution application) installed in this terminal device 20 being executed by this terminal device 20.

3-2. Functions of Server Device 30

A specific example of the functions of the server device 30 will be described also with reference to FIG. 3. As the functions of the server device 30, for example, some of the functions of the terminal device 20 described above can be used. Accordingly, reference numerals given to the components of the server device 30 are presented in parentheses in FIG. 3.

First, in the "second aspect" described above, the server device 30 can include an acquisition unit 200 to a communication unit 260, which are the same as the acquisition unit 100 to the communication unit 160 described in relation to the terminal device 20, respectively, except for the differences described below.

In the "second aspect", however, it can be assumed that the server device 30 is arranged in a studio or the like or any other location and is used by a plurality of performers (users). Accordingly, the teacher data storage unit 224 can store teacher data corresponding to the first data and/or the second data in association with each of the plurality of performers. The stored teacher data corresponding to each performer can be applied to the classifier 221 in association with the performer by the user setting adjustment unit 225.

The first sensor 202 and the second sensor 204, which form the acquisition unit 200, can be arranged in the studio or the like or any other location where the server device 30 is installed in such a manner as to face the performer in a space where the performer performs. Likewise, a display, a touch panel, and so forth, which form the display unit 250, can also be arranged to face the performer or near the performer in the space where the performer performs.

Likewise, the user profile storage unit 226 can store a learning model (trained model) in association with each of the plurality of performers. The stored learning model corresponding to each performer can be applied to the classifier 221 in association with the performer by the user setting adjustment unit 225.

Alternatively, the user setting adjustment unit 225 may apply teacher data stored in the teacher data storage unit 224 in association with a certain performer to the classifier 221 in association with another performer. Likewise, the user setting adjustment unit 225 may apply a learning model (trained model) stored in the user profile storage unit 226 in association with a certain performer to the classifier 221 in association with another performer.

The communication unit 260 can distribute a file containing a moving image stored in the storage unit 240 in association with each performer to a plurality of terminal devices 20 via the communication network 10. Each of the plurality of terminal devices 20 executes a predetermined application installed therein (e.g., a moving-image viewing application) and transmits a signal for requesting distribution of a desired moving image (request signal) to the server device 30, thereby being able to receive the desired moving image from the server device 30 that has responded to this signal via the predetermined application.

The information (such as a file containing a moving image) stored in the storage unit 240 may be stored in one or more other server devices (storages) 30 capable of communicating with the server device 30 via the communication network 10.

Further, the communication unit 260 can receive learning models (trained models) and the like from the plurality of terminal devices 20 via the communication network 10 and store them in the storage unit 240 and/or the user profile storage unit 226. The stored learning model (trained model) and the like may be shared among a plurality of performers by the user setting adjustment unit 225 in the server device 30, or may be transmitted to any terminal device 20 via the communication network 10 by the communication unit 260 and shared by the terminal device 20.

In the "first aspect" described above, in contrast, the acquisition unit 200 to the moving image generation unit 230, which are used in the "second aspect" described above, can be used as an option. In addition to operating in the manner described above, the communication unit 260 can store a file containing a moving image, which is transmitted from each terminal device 20 and received from the communication network 10, in the storage unit 240 and then distribute the file to the plurality of terminal devices 20.

In the "third aspect", in contrast, the acquisition unit 200 to the moving image generation unit 230, which are used in the "second aspect" described above, can be used as an option. In addition to operating in the manner described above, the communication unit 260 can store a file containing a moving image, which is transmitted from the studio unit 40 and received from the communication network 10, in the storage unit 240 and then distribute the file to the plurality of terminal devices 20.

3-3. Functions of Studio Unit 40

The studio unit has a configuration similar to that of the terminal device 20 or the server device 30 illustrated in FIG. 3, it may include circuits and/or processing circuitry as discussed above with respect to terminal device 20 and server device 30, thereby being able to perform an operation similar to that of the terminal device 20 or the server device 30. However, the communication unit 160 (260) can transmit a moving image generated by the moving image generation unit 130 (230) and stored in the storage unit 140 (240) to the server device 30 via the communication network 10.

In particular, the first sensor 102 (202) and the second sensor 104 (204), which form the acquisition unit 100 (200), can be arranged in a studio or the like or any other location where the studio unit 40 is installed, in such a manner as to face a performer in the space where the performer performs. Likewise, a display, a touch panel, and so forth, which form the display unit 150 (250), can also be arranged to face the performer or near the performer in the space where the performer performs.

4. Example of Plurality of Facial Expressions to be Classified

Next, a specific example of a plurality of predetermined specific facial expressions that can be classified by the classifier 121 disposed in the terminal device 20 (or the classifier 221 disposed in the server device 30) will be described.

In one embodiment, the plurality of predetermined specific facial expressions may mainly include, without limitation, facial expressions that express emotions including pleasure, anger, sorrow, and joy, facial expressions in which the face shape is unrealistically deformed, and facial expressions in which the face is given a symbol, a shape, and/or a color. In one embodiment, the plurality of predetermined specific facial expressions can be a combination of a plurality of facial expressions enumerated in this manner.

4-1. Facial Expressions that Express Emotions Including Pleasure, Anger, Sorrow, and Joy The facial expressions that express emotions including pleasure, anger, sorrow, and joy can change in accordance with the content of the emotion and the intensity of the emotion. Specific examples of the facial expressions that express emotions including pleasure, anger, sorrow, and joy are illustrated in FIG. 6F, FIG. 6G, FIG. 6I, FIG. 6J, FIG. 6M, FIG. 6N, and so forth described below.

The facial expressions that express emotions including pleasure, anger, sorrow, and joy can be shown based on a user interface mapped into a language- and culture-independent psychological space, and can be shown based on, for example, a user interface represented by "Plutchik's Wheel of Emotions". A specific example of "Plutchik's Wheel of Emotions" is illustrated in FIG. 4.

Figure 4:
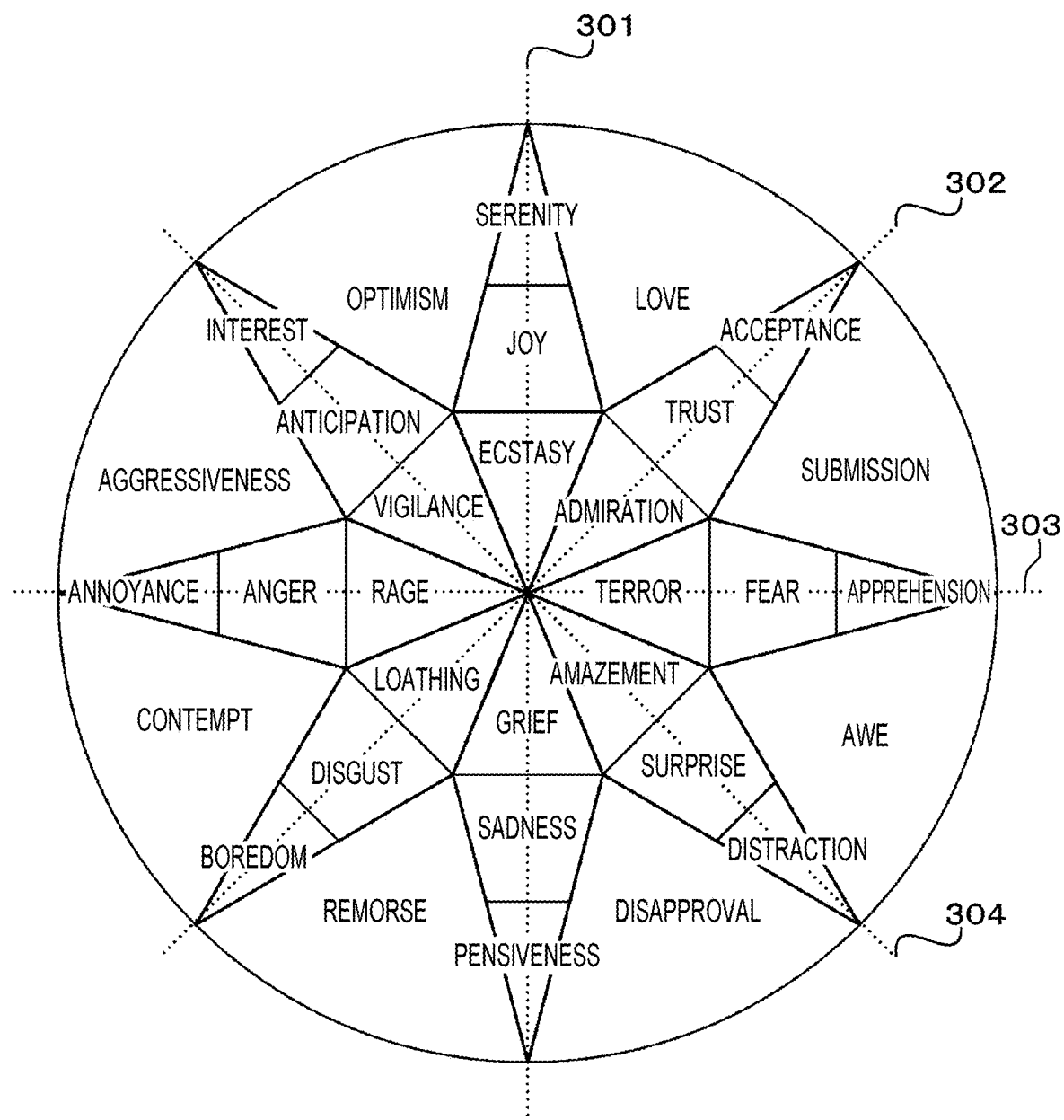
FIG. 4 is a schematic diagram illustrating a specific example of "Plutchik's Wheel of Emotions", which is used by the terminal device illustrated in FIG. 1.

In one embodiment, a facial expression of a virtual character (moving image) to be displayed in a moving image can be prepared for each of a plurality of elements included in "Plutchik's Wheel of Emotions" exemplified in FIG. 4. FIG. 4 illustrates, for example, 24 elements (=4 axes×6 elements) as the plurality of elements. Further, a user interface that mimics "Plutchik's Wheel of Emotions" can be displayed on the display unit 150 (250) (e.g., in accordance with a request made by a performer).

During a performance, the performer can designate a specific facial expression that they wish to display by tapping, clicking, or the like on an area corresponding to an element (facial expression) that they wish to display in a state where the user interface that mimics "Plutchik's Wheel of Emotions" is being displayed (or is not being displayed) on the display unit 150 (250). The display unit 150 (250) may be a touch panel or the like. In one embodiment, the 24 elements are assigned, for example, "−3", "−2", "−1", "0", "1", "2", and "3" for each axis (each of the four axes, namely, axis 301 to axis 304). "0" is the origin. Accordingly, the performer is able to designate the desired element among the 24 elements. For example, for the axis 303, "annoyance", "anger", "rage", "terror", "fear", and "apprehension" can be assigned "−3", "−2", "−1", "1", "2", and "3", respectively.

Alternatively, during a performance, the performer performs a swipe operation in a state where the user interface that mimics "Plutchik's Wheel of Emotions" is being displayed (or is not being displayed) on the display unit 150 (250), thereby being able to designate a specific facial expression that they wish to display in accordance with the direction and amount of movement of the swipe operation. For example, in accordance with the direction in which and the amount by which the performer performs a swipe operation from the origin along the axis 302 illustrated in FIG. 4, it is possible to designate "admiration" (an amount of movement of 1), "trust" (an amount of movement of 2), "acceptance" (an amount of movement of 3), "loathing" (an amount of movement of −1), "disgust" (an amount of movement of −2), and "boredom" (an amount of movement of −3).

In this manner, data indicating the facial expression designated by the performer among the plurality of facial expressions that express emotions including pleasure, anger, sorrow, and joy can be output from the manual input unit 123 (223) to the facial expression selection unit 122 (222) described above as "specific facial expression designation data".

4-2. Facial Expressions in which Face Shape is Unrealistically Deformed

Figure 7:
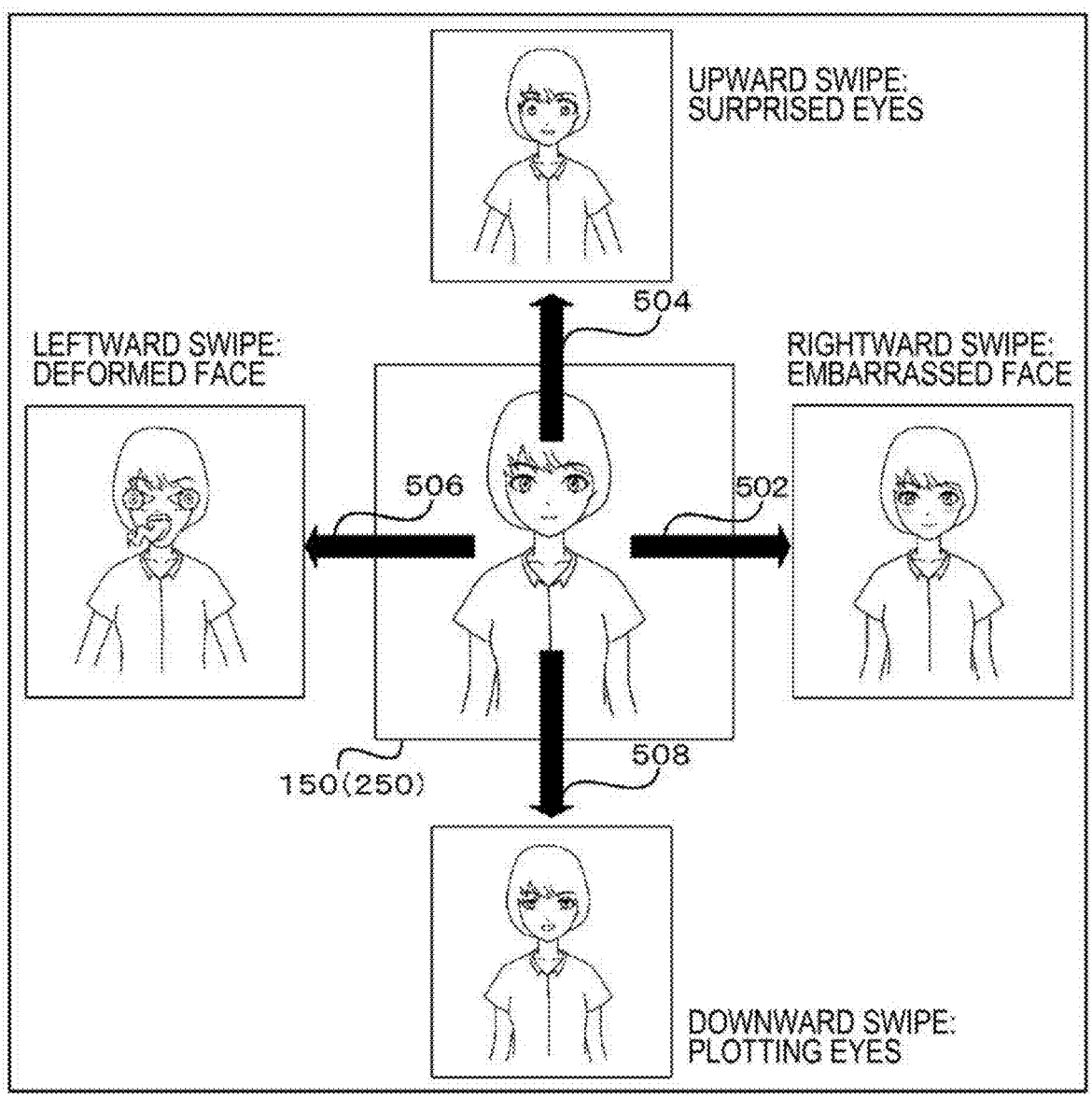
FIG. 7 is a diagram schematically illustrating an example manual input made by a performer on the terminal device illustrated in FIG. 1 during a performance.

The facial expressions in which the face shape is unrealistically deformed include facial expressions in which a portion of the face is deformed in an unrealistic manner (e.g., like that of a cartoon), an example of which is illustrated in ("deformed face" in) FIG. 7.

In one embodiment, a plurality of facial expressions in which the face shape is unrealistically deformed may be prepared. A performer performs a swipe operation in a state where information (user interface) identifying the plurality of facial expressions is being displayed (or is not being displayed) on the display unit 150 (250) (such as a touch panel), thereby being able to designate a specific facial expression that they wish to display in accordance with the direction of the swipe operation (or the direction and amount of movement of the swipe operation).

In this manner, data indicating the facial expression designated by the performer among the plurality of facial expressions in which the face shape is unrealistically deformed can be output from the manual input unit 123 (223) to the facial expression selection unit 122 (222) described above as "specific facial expression designation data".

4-3. Facial Expressions in which Face is Given Symbol, Shape, and/or Color

The facial expressions in which the face is given a symbol, a shape, and/or a color include facial expressions in which the face is given, for example, (1) symbols such as "#" and "><", (2) shapes that mimic sweat, stars, veins, and so forth, (3) red color representing blushing, and so forth. Specific examples of such expressions are illustrated in FIG. 6C, FIG. 6D, FIG. 6E, FIG. 6G, FIG. 6H, FIG. 6J, and so forth.

In one embodiment, for facial expressions in which the face is given a symbol, a shape, and/or a color, like a plurality of facial expressions in which the face shape is unrealistically deformed, a performer performs a swipe operation in a state where information (user interface) identifying the plurality of facial expressions is being displayed (or is not being displayed) on the display unit 150 (250), thereby being able to designate a specific facial expression that they wish to display in accordance with the direction of the swipe operation (or the direction and amount of movement of the swipe operation).

In this manner, data indicating the facial expression designated by the performer among the facial expressions in which the face is given a symbol, a shape, and/or a color can be output from the manual input unit 123 (223) to the facial expression selection unit 122 (222) described above as "specific facial expression designation data".

5. Example Algorithm Used by Facial Expression Selection Unit 122 (222)

Next, an example algorithm used by the facial expression selection unit 122 in the terminal device 20 (the facial expression selection unit 222 in the server device 30) will be described.

The facial expression selection unit 122 can execute, for example, a first process to a fifth process exemplified as follows. When a predetermined condition described below corresponding to each of the first process to the fifth process is satisfied, the facial expression selection unit 122 can execute the corresponding one of the first process to the fifth process. When a plurality of processes among the first process to the fifth process are executable, the facial expression selection unit 122 can execute any one of the plurality of processes according to the priority given to the first process to the fifth process (the first process is given the highest priority, and the fifth process is given the lowest priority). The facial expression selection unit 122 may not necessarily execute all of the first process to the fifth process exemplified below, but may execute at least one process among the first process to the fifth process.

(1) First Process (Base Color of Face like "Face Blushing")

The first process is a process for setting the base color of the face of a virtual character to make the facial expression of the virtual character mimic physiological phenomena such as face blushing, for example.

The facial expression selection unit 122 executes the first process in response to direct or indirect sensing of a physiological phenomenon of a performer based on non-verbal feedback information. The method for sensing a physiological phenomenon of a performer based on non-verbal feedback information can be implemented as, for example, various methods disclosed in Japanese Patent Application No. 2018-164520 (which is incorporated herein in its entirety by reference). The non-verbal feedback information may include, for example, biometric information of the performer detected by a biometric information sensor, images and video of the performer captured by a camera, an acceleration detected by an acceleration sensor, and so forth.

Specifically, a technique for generating emotional information indicating the emotions of a performer on the basis of the biometric information of the performer can be implemented as a technique described in "Ningen no kanjo wo kouryo shita baiometorikusu jouhougaku wakushoppu 2004 (Biometrics considering human emotions, Workshop on Informatics 2004), September 2014" (which is incorporated herein in its entirety by reference). The biometric information of the performer detected by the biometric information sensor may include body temperature, respiratory rate, pulse, eye movement, oxygen concentration in blood, myoelectric potential (electric potential generated by muscles), and other information detectable for living body.

It is also possible to estimate the emotions of a performer from a face image captured by a camera by using a technique disclosed in, for example, Japanese Unexamined Patent Application Publication No. 3-252775 (which is incorporated herein in its entirety by reference). Specifically, facial expression patterns stored in association with emotions (pleasure, anger, sorrow, and joy) are searched for a facial expression pattern having an image similar to a face image of the performer captured by the camera, and an emotion associated with the facial expression pattern is acquired. Accordingly, the emotion of the performer can be estimated.

In addition, for example, as disclosed in "Real-time behavior analysis method using WebSocket for entertainment content watching on smartphones" (Entertainment Computing Symposium (EC 2013), October 2013) (which is incorporated herein in its entirety by reference), the square root of the sum of squares of acceleration for three axes detected by a built-in acceleration sensor of a smartphone held by the performer is calculated, and it is possible to detect the performer laughing when the calculated square root of the sum of squares is greater than or equal to a predetermined value (e.g., 0.2 [G] or 0.1 [G]).

In the first process, the facial expression selection unit 122 outputs "final designation data" indicating a facial expression with a color corresponding to the face of the virtual character to the moving image generation unit 130 for a preset time (e.g., several tens of seconds). Accordingly, upon receipt of the "final designation data", the moving image generation unit 130 can generate a moving image in which the virtual character sustains such a facial expression for the set time described above and then returns to a normal state.

(2) Second Process (Manual Display)

The second process is a process for selecting, among a plurality of predetermined specific facial expressions, a specific facial expression directly specified by a performer, rather than a specific facial expression classified by the classifier 121, as a facial expression to be displayed in the moving image.

The facial expression selection unit 122 executes the second process if data designating a facial expression to be displayed ("specific facial expression designation data") is input to the manual input unit 123 by the performer via the user interface and a condition in which the facial expression selection unit 122 has received the "specific facial expression designation data" from the manual input unit 123 is satisfied.

In the second process, the facial expression selection unit 122 selects a specific facial expression identified by the "specific facial expression designation data" from among the plurality of predetermined specific facial expressions as a facial expression to be displayed in a moving image. The facial expression selection unit 122 outputs data indicating the selected specific facial expression ("final designation data") to the moving image generation unit 130. Accordingly, upon receipt of the "final designation data", the moving image generation unit 130 generates a predetermined moving image associated with the specific facial expression.

(3) Third Process (Event-Driven)

The third process is a process for selecting, in response to the occurrence of a predetermined event, a facial expression determined for the event as a facial expression to be displayed in the moving image.

The facial expression selection unit 122 executes the third process if a condition in which a physics engine internal or external to the facial expression selection unit 122 detects the occurrence of a predetermined event is satisfied. The facial expression selection unit 122 can determine in advance a specific facial expression to be displayed in a moving image in association with each of a plurality of predetermined events. For example, the facial expression selection unit 122 can determine the facial expression "the face of the virtual character with the symbol 'x' shown" for an event in which "an object falls and hits the head of the virtual character (in the world in which the virtual character lives, for example, in a game)". Alternatively, the facial expression selection unit 122 can determine the facial expression in which "the face of the virtual character is colored pale blue" for an event in which "the hit points (physical strength) of the virtual character have fallen below a predetermined value (in the world in which the virtual character lives, for example, in a game)".

Also in the third process, the facial expression selection unit 122 selects a specific facial expression identified by the "specific facial expression designation data" among a plurality of predetermined specific facial expressions as a facial expression to be displayed in the moving image. The facial expression selection unit 122 outputs data indicating the selected specific facial expression ("final designation data") to the moving image generation unit 130. Accordingly, upon receipt of the "final designation data", the moving image generation unit 130 can generate a moving image in which the virtual character sustains the specific facial expression for a certain period of time.

(4) Fourth Process (Predetermined Specific Facial Expression) and Fifth Process (Natural Facial Expression)

The fourth process and the fifth process are both processes for selecting a facial expression identified by specific facial expression data received from the classifier 121.

The facial expression selection unit 122 executes the fourth process if a condition in which "specific facial expression data" designating a specific facial expression is received from the classifier 121 is satisfied. The facial expression selection unit 122 executes the fifth process if a condition in which "specific facial expression data" designating "other facial expressions" is received from the classifier 121 is satisfied.

The facial expression selection unit 122 outputs, to the moving image generation unit 130, "final designation data" specifying a facial expression identified by the "specific facial expression data" as a facial expression to be displayed in the moving image. Accordingly, if the facial expression selection unit 122 executes the fourth process, the moving image generation unit 130 generates a moving image in which the virtual character has the specific facial expression. If the facial expression selection unit 122 executes the fifth process, in contrast, the moving image generation unit 130 generates a moving image in which the facial expression of the virtual character changes in a lip-sync and eye-tracking manner with movement of the face of the performer.

6. Operation of Communication System 1

Next, a specific example of the operation of the communication system 1 having the configuration described above will be described with reference to FIG. 5. FIG. 5 is a flowchart illustrating an example operation performed by the communication system 1 illustrated in FIG. 1.

In step (hereinafter referred to as "ST") 402, the terminal device 20 (or the server device 30) acquires learning data. Specifically, first, the terminal device 20 plays back and displays on the display unit 150 a moving image serving as a tutorial of, for example, about ten seconds that is prepared for each of a predetermined number of specific facial expressions (e.g., specific facial expressions, the number of which is specified by the performer).

Figure 6B:
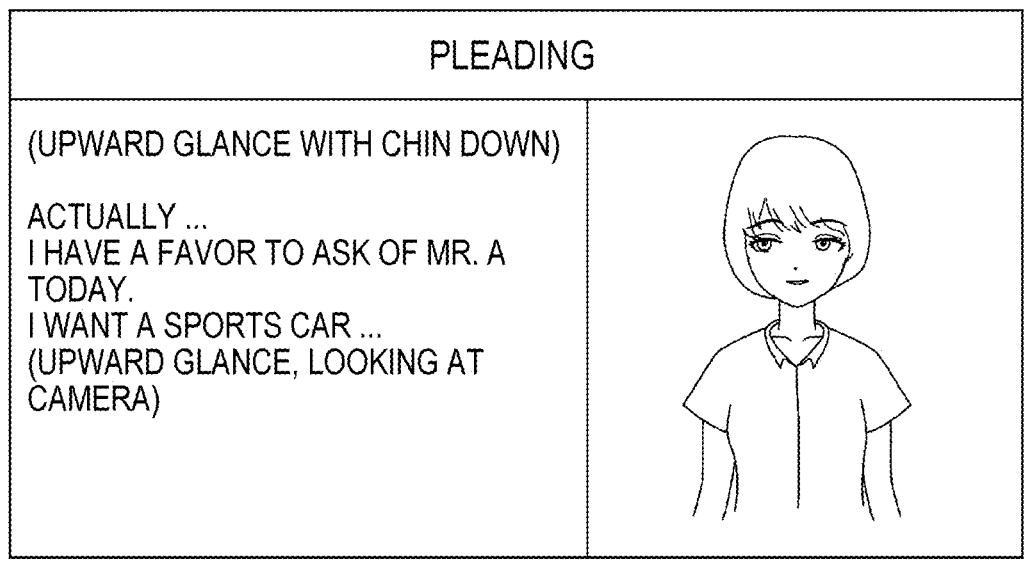
FIG. 6B is a diagram schematically illustrating another example tutorial displayed on the display unit of the terminal device illustrated in FIG. 1.
Figure 6C:
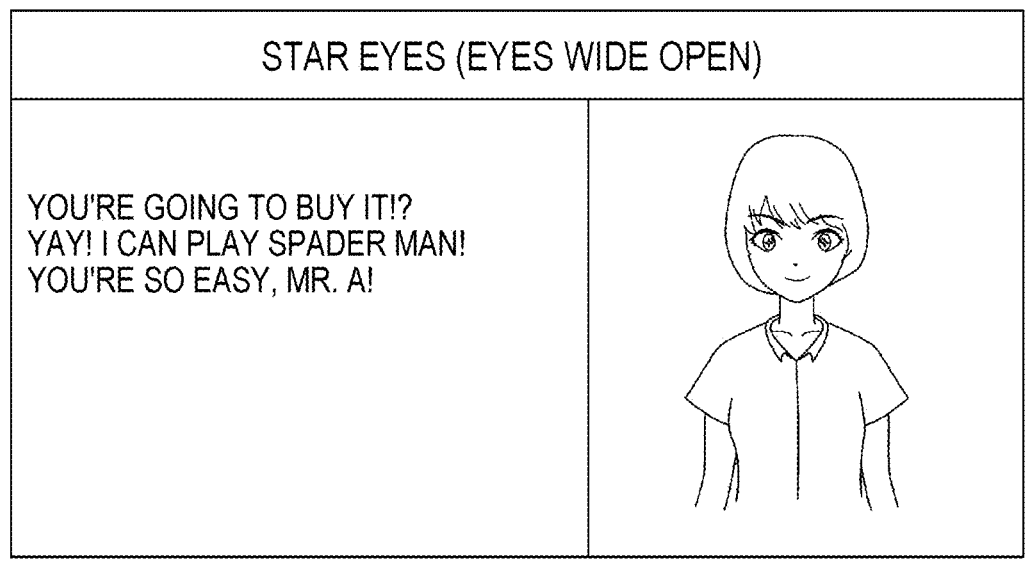
FIG. 6C is a diagram schematically illustrating still another example tutorial displayed on the display unit of the terminal device illustrated in FIG. 1.
Figure 6D:
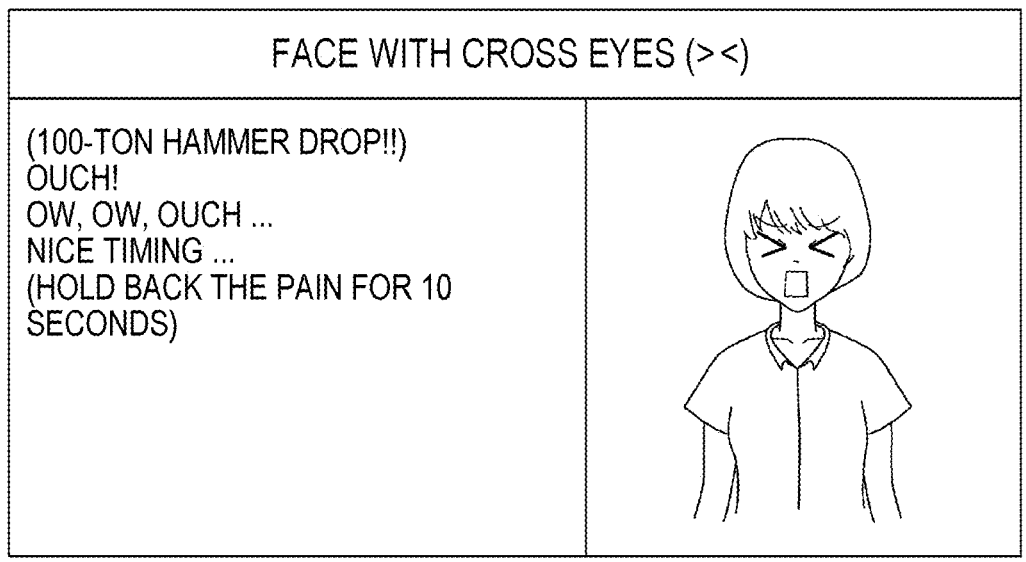
FIG. 6D is a diagram schematically illustrating still another example tutorial displayed on the display unit of the terminal device illustrated in FIG. 1.
Figure 6E:
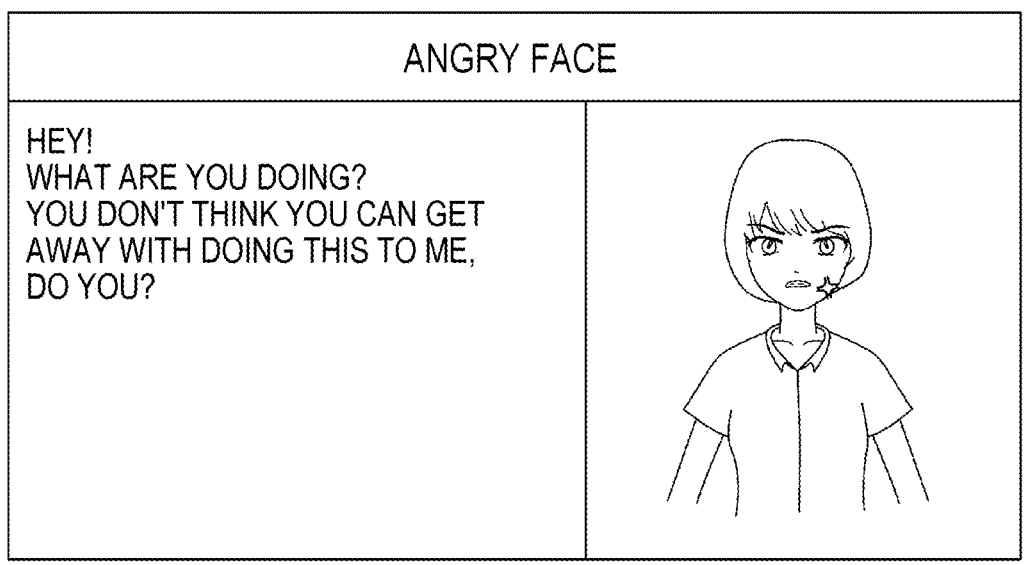
FIG. 6E is a diagram schematically illustrating still another example tutorial displayed on the display unit of the terminal device illustrated in FIG. 1.
Figure 6F:
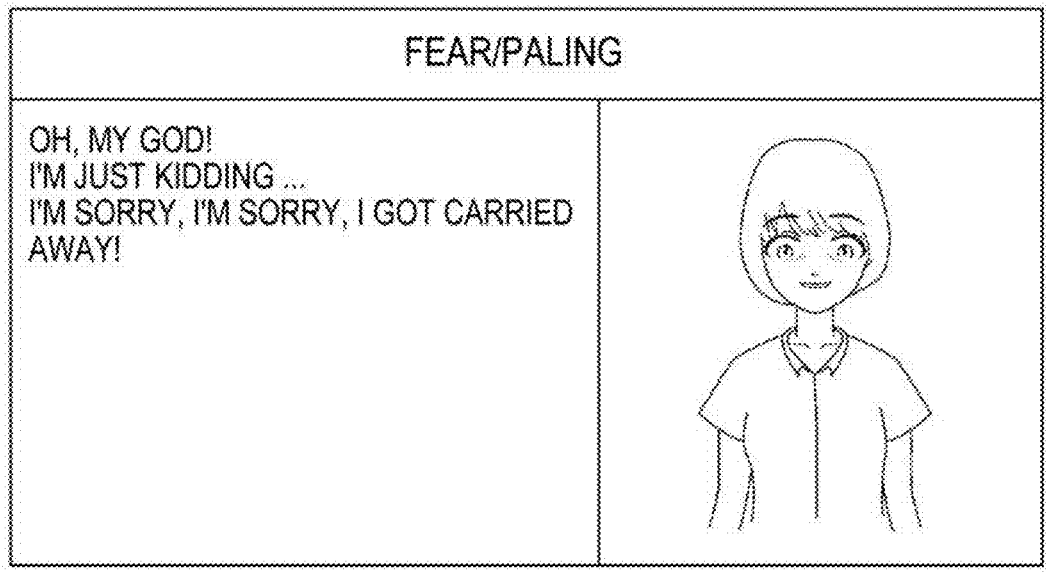
FIG. 6F is a diagram schematically illustrating still another example tutorial displayed on the display unit of the terminal device illustrated in FIG. 1.
Figure 6G:
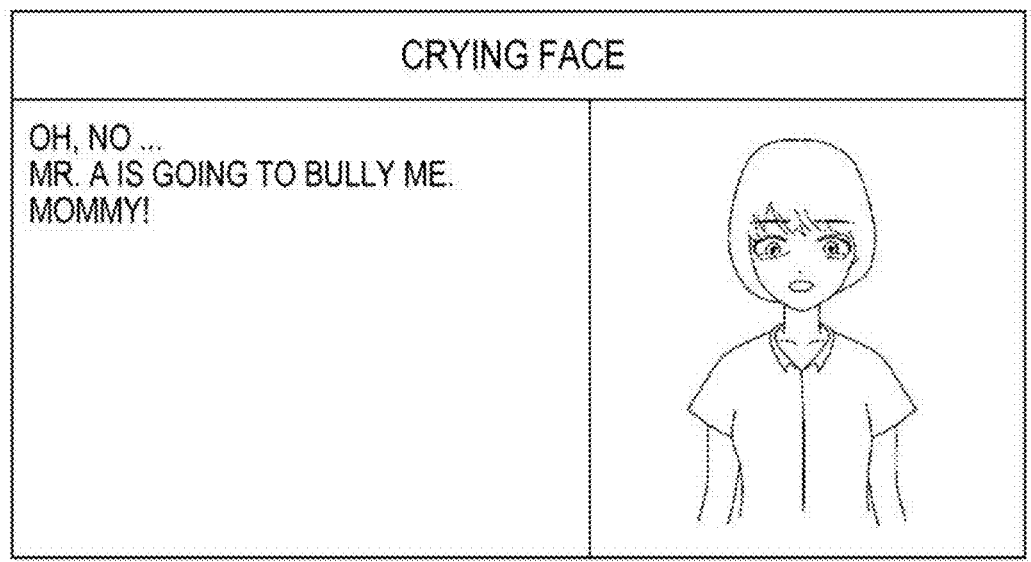
FIG. 6G is a diagram schematically illustrating still another example tutorial displayed on the display unit of the terminal device illustrated in FIG. 1.
Figure 6H:
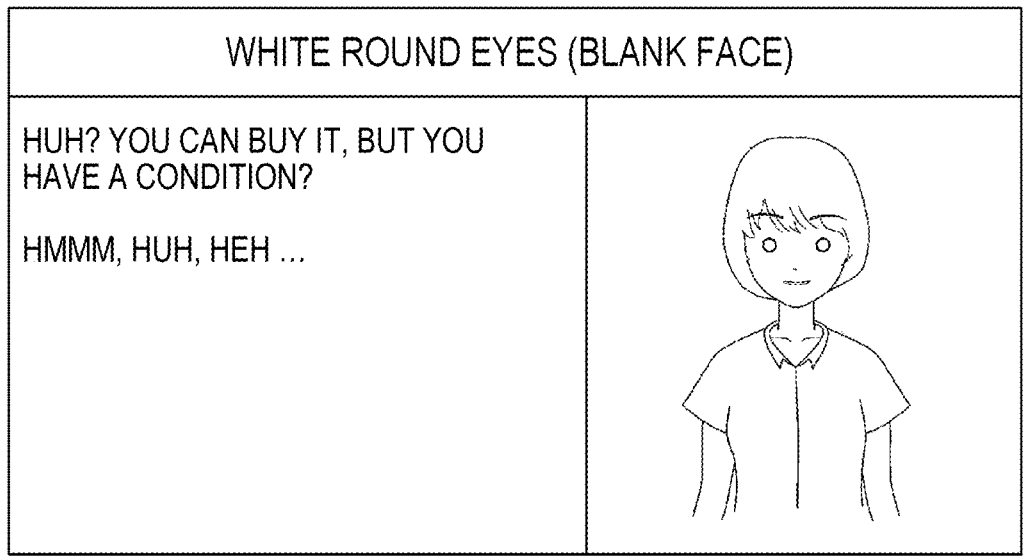
FIG. 6H is a diagram schematically illustrating still another example tutorial displayed on the display unit of the terminal device illustrated in FIG. 1.
Figure 6I:
FIG. 6I is a diagram schematically illustrating still another example tutorial displayed on the display unit of the terminal device illustrated in FIG. 1.
Figure 6J:
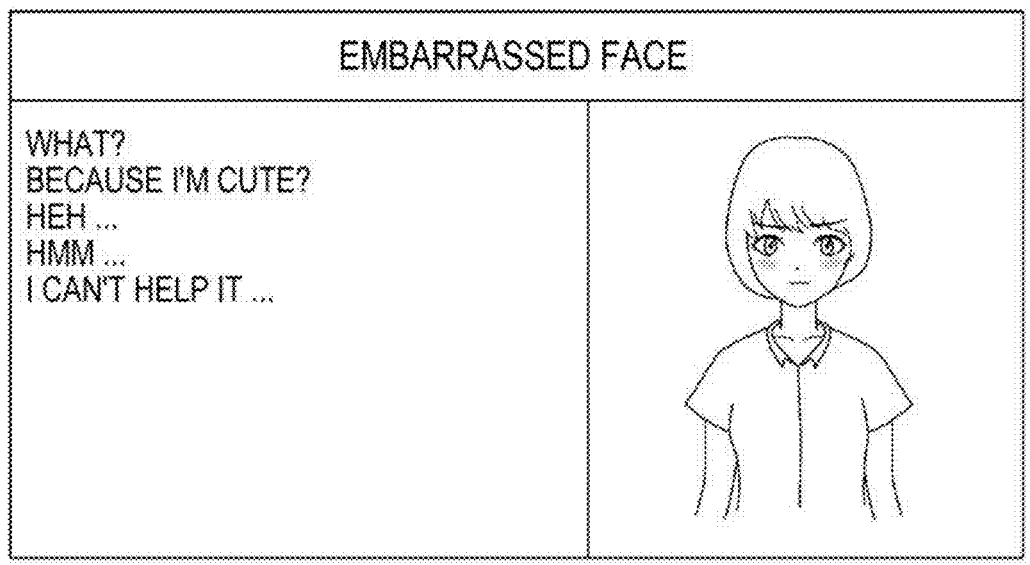
FIG. 6J is a diagram schematically illustrating still another example tutorial displayed on the display unit of the terminal device illustrated in FIG. 1.
Figure 6K:
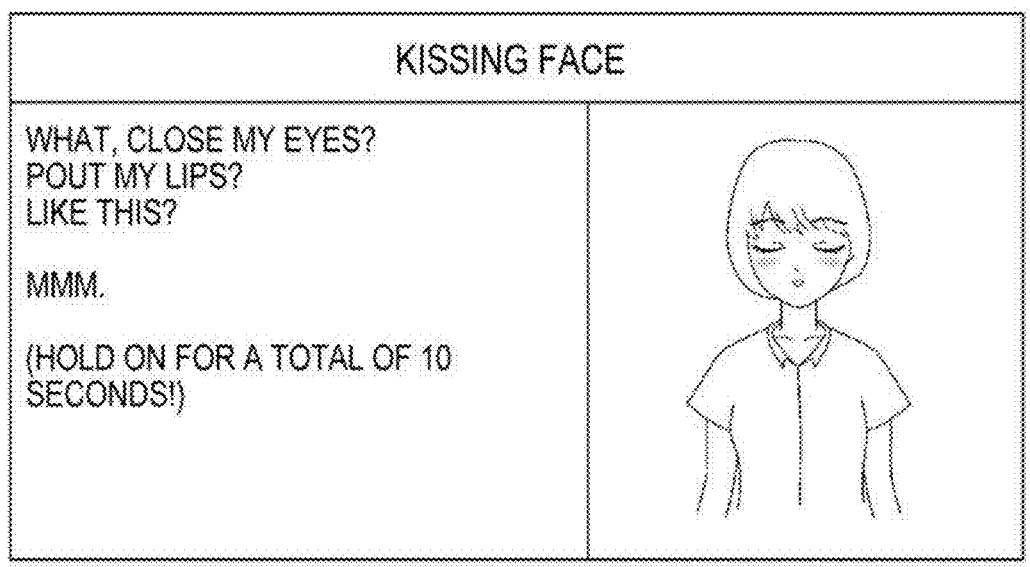
FIG. 6K is a diagram schematically illustrating still another example tutorial displayed on the display unit of the terminal device illustrated in FIG. 1.
Figure 6L:
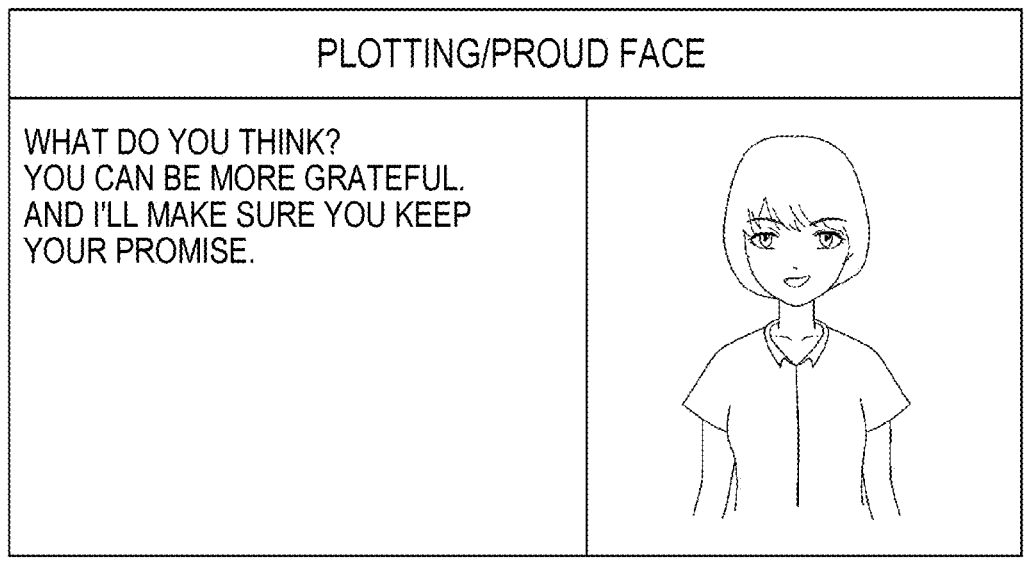
FIG. 6L is a diagram schematically illustrating still another example tutorial displayed on the display unit of the terminal device illustrated in FIG. 1.
Figure 6M:
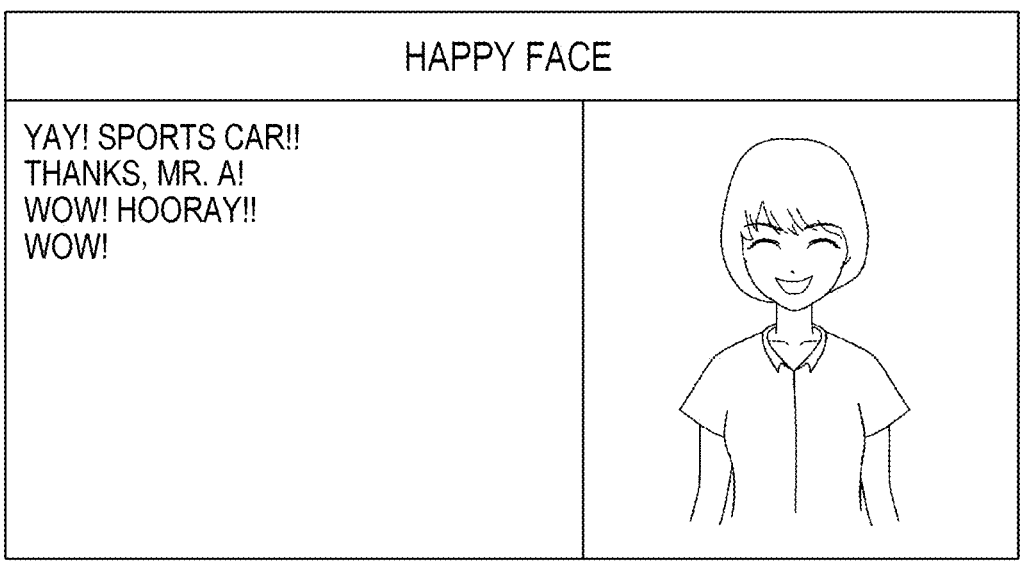
FIG. 6M is a diagram schematically illustrating still another example tutorial displayed on the display unit of the terminal device illustrated in FIG. 1.
Figure 6N:
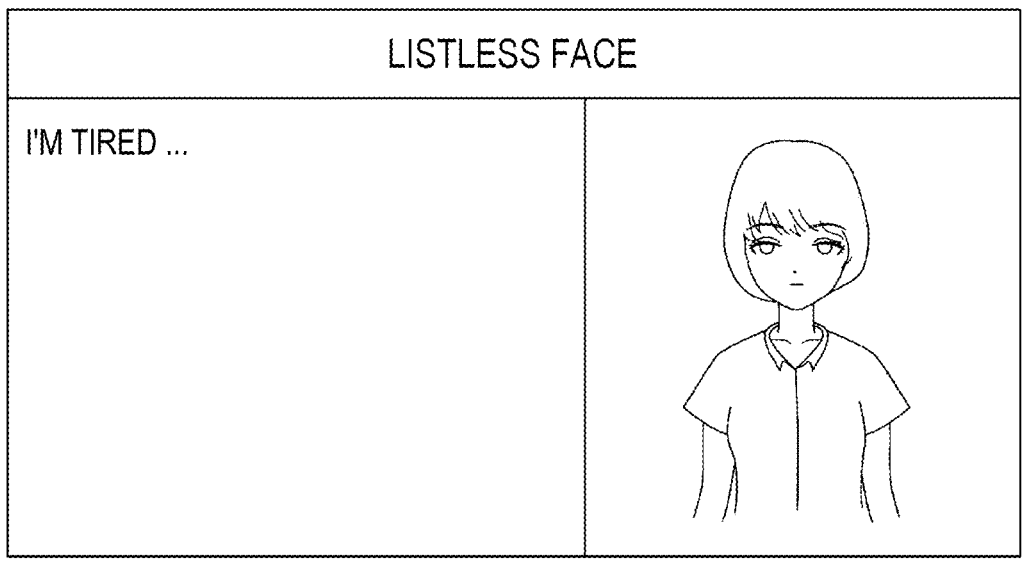
FIG. 6N is a diagram schematically illustrating still another example tutorial displayed on the display unit of the terminal device illustrated in FIG. 1.

FIG. 6A to FIG. 6N are diagrams illustrating specific examples of tutorials on specific facial expressions to be displayed on the terminal device 20 (the server device 30) illustrated in FIG. 1. As exemplified in FIG. 6A to FIG. 6N, a tutorial on each specific facial expression can include instructions concerning the facial expression to be performed by the performer, and a text (script) to be read aloud by the performer. The instructions concerning the facial expression to be performed by the performer can include, for example, instructions (script) such as "upward glance with the chin down" in FIG. 6B and "open the eyes wide" in FIG. 6C.

The performer facing the terminal device 20 that plays back and displays such a tutorial reads aloud the displayed words while performing the instructed facial expression in accordance with the timing of the tutorial.

In parallel with the playback of the tutorial, as described above, the terminal device 20 generates data (e.g., an MPEG file) in which an image captured using the RGB camera included in the first sensor 102 is recorded in association with a time code. In such an MPEG file or the like, information identifying one of a plurality of specific facial expressions (e.g., the plurality of specific facial expressions illustrated in FIG. 6A to FIG. 6N) can be stored in association with a time code.

Further, as described above, the terminal device 20 generates data (e.g., a TSV file) in which numerical values indicating depths of individual feature points are recorded in association with a time code, by using the near-infrared camera included in the first sensor 102. In such a TSV file or the like, information identifying one of a plurality of specific facial expressions (e.g., the plurality of specific facial expressions illustrated in FIG. 6A to FIG. 6N) can be stored in association with a time code.

Further, as described above, the terminal device 20 generates data (e.g., an MPEG file) in which audio is recorded in association with a time code, by using the microphone included in the second sensor 104. In such an MPEG file or the like, information identifying one of a plurality of specific facial expressions (e.g., the plurality of specific facial expressions illustrated in FIG. 6A to FIG. 6N) can be stored in association with a time code.

Then, as described above, the terminal device 20 generates first data (first data indicating the amounts of movement of the respective feature points in the temporal direction) and/or second data (including data related to loudness, sound pressure, speech rate, formant, and/or the like at each time, and/or data indicating a word, a word ending, an exclamation, and/or the like at each time) using the processing unit 110.

Then, the terminal device 20 causes the classifier 121 to learn a plurality of specific facial expressions using at least one of the following pieces of data: the first data and the second data (from the processing unit 110); and the data (such as an MPEG file and a TSV file) related to the face of a performer and the audio data (such as an MPEG file) related to speech and/or singing sounds produced by the performer (from the acquisition unit 100).

Specifically, the classifier 121 uses data (such as an MPEG file) related to the face of a performer to assign, to an image of the performer captured in association with a tutorial on each specific facial expression, information identifying the specific facial expression as teacher data (perform annotation). For example, information (teacher data) "pleading" is assigned to an image of the performer captured in association with a tutorial on "pleading" illustrated in FIG. 6B. The teacher data obtained in this way can be stored in the teacher data storage unit 124 and/or the user profile storage unit 126.

Further, the classifier 121 can perform principal component analysis using a plurality of pieces of data among the following pieces of data: the first data and the second data (from the processing unit 110); and the data (such as an MPEG file and a TSV file) related to the face of a performer and the audio data (such as an MPEG file) related to speech and/or singing sounds produced by the performer (from the acquisition unit 100). In the principal component analysis, the classifier 121 can use, for example, as elements, the amounts of movement of the respective feature points in the temporal direction, loudness, and so forth. Through such principal component analysis, the classifier 121 acquires a semantic vector for classifying a plurality of specific facial expressions. This allows the classifier 121 to generate a learning model (including an algorithm for classifying a plurality of specific facial expressions, and parameters used in the algorithm). The principal component analysis performed by the classifier 121 will be described below.

Learning for the plurality of specific facial expressions described above in relation to ST402 may be performed in one take or a plurality of takes for each of the plurality of specific facial expressions, or may be performed in one take or a plurality of takes for only a specific facial expression selected by the performer from among the plurality of specific facial expressions.

Alternatively, learning for the plurality of specific facial expressions described above in relation to ST402 may be performed once or a plurality of times after recursive learning in ST404 described below is performed.

In this way, the performer performs in accordance with a tutorial related to each of a plurality of specific facial expressions, thereby allowing the classifier 121 of the terminal device 20 to perform learning for the plurality of specific facial expressions. This allows the classifier 121 of the terminal device 20 to classify the plurality of specific facial expressions. Thus, the performer can generate a moving image in which the virtual character is caused to have a plurality of specific facial expressions, without knowing what facial expressions and poses are available. As a result, it is possible to improve convenience for, in particular, users who use this service.

Then, in ST404, the terminal device 20 generates a moving image in which the facial expression of the virtual character is changed on the basis of a performance that the performer gives while looking at the display unit 150 (such as a touch panel) of the terminal device 20. Specifically, as described in "3-1" and "5" above, the terminal device 20 causes the processing unit 110 to the moving image generation unit 130 to operate to generate a moving image.

In one embodiment, the terminal device 20 can display the moving image on the display unit 150 in real time in accordance with the performer's changing their facial expression. This moving image is a moving image in which the virtual character is caused to show a specific facial expression selected from among a plurality of predetermined specific facial expressions on the basis of a facial expression that changes in this manner. If no corresponding specific facial expression exists in a plurality of predetermined specific facial expressions, this moving image is a moving image in which the virtual character is caused to show a natural facial expression. For example, when the performer has a natural facial expression, the terminal device 20 can display, on the display unit 150, a moving image in which the facial expression of the virtual character is changed in a lip-sync and eye-tracking manner with movement of the face of the performer. When the face of the performer shows a specific facial expression, in contrast, the terminal device 20 can display, on the display unit 150, a moving image in which the facial expression of the virtual character is changed so as to correspond to the specific facial expression.

In this respect, in the technique disclosed in PTL 2 described above, while the performer is performing a flick operation on the screen when speaking or singing, unnatural movements may be shown, such as the facial expression of the virtual character becoming serious for a moment. In one embodiment disclosed herein, in contrast, the facial expression of the virtual character can smoothly change in a period between a state in which the performer has a natural facial expression and a state in which the performer has a specific facial expression, in accordance with each state. Even if the virtual character moves unnaturally, as described in "5.(2)" above, the performer inputs data designating a facial expression to be displayed ("specific display designation data") via the user interface, thereby allowing the virtual character to show the specific facial expression designated by the performer. In addition, as described in "3-1.(3)" above, the specific display instruction data is used as teacher data, thereby suppressing a situation in which the virtual character shows an unnatural facial expression under similar conditions.

FIG. 7 exemplifies a scene of a moving image displayed on the display unit 150 of the terminal device 20 in real time in accordance with the performance of the performer. With only the learning performed by the terminal device 20 in ST402, the terminal device 20 may not necessarily be able to correctly classify a plurality of specific facial expressions intended by the performer. For example, although the performer is actually showing an embarrassed face, the terminal device 20 may generate a moving image in which the virtual character is laughing. In such a case, the performer can perform a rightward swipe operation 502 over the display unit 150 serving as a touch panel, for example, at the moment when the virtual character is laughing against the performer's intention. When the facial expression actually shown by the performer is, for example, one of facial expressions with "surprised eyes", "deformed face", and "plotting eyes", the performer can perform a corresponding one of an upward swipe operation 504, a leftward swipe operation 506, and a downward swipe operation 508, respectively.

Accordingly, as described in "3-1" above, the manual input unit 123 of the terminal device 20 (see FIG. 3) outputs "specific facial expression designation data" designating an "embarrassed face" as the facial expression to be displayed to the facial expression selection unit 122. This allows the moving image generation unit 130 to generate a moving image in which the virtual character shows the specific facial expression "embarrassed face". In parallel to this, the manual input unit 123 can cause the teacher data storage unit 124 to store the "specific facial expression designation data" designating the "embarrassed face" as teacher data for target data corresponding to the point in time when the moving image against the performer's intention is displayed on the display unit 150. The target data is at least one of the following pieces of data: the first data; the second data; the data (such as an MPEG file and a TSV file) related to the face of a performer; and the audio data (such as an MPEG file) related to speech and/or singing sounds produced by the performer. The teacher data can be provided (applied) to the classifier 121 by the user setting adjustment unit 125. In this manner, manual input made by the performer during the performance allows the classifier 121 of the terminal device 20 to recursively learn a plurality of specific facial expressions.

While an embodiment in which a performer designates, during a performance, their intended specific facial expression only using directions of the swipe operation (four directions, by way of example) has been described with reference to FIG. 7, this embodiment is merely an example. In another embodiment, it is also possible for a performer to designate, during a performance, their intended specific facial expression using both the direction(s) (one or more directions) and the amount of movement of the swipe operation. For example, it is possible to designate the "embarrassed face" when the performer swipes a short distance to the right, and to designate the "happy face" when the performer swipes a long distance to the right.

Further, while an embodiment in which a performer performs, during a performance, an operation of designating their intended facial expression through a swipe operation has been described with reference to FIG. 7, this embodiment is merely an example. In another embodiment, the performer may perform such designation when the moving image is played back after the performance is completed.

Also in ST404, as in ST402, the classifier 121 may execute principal component analysis to perform learning. In this case, the classifier 121 can use, as an element, "specific facial expression designation data" that is manually input by the performer in addition to the amounts of movement of the respective feature points in the temporal direction, loudness, and so forth.

In this manner, repeatedly performing the operation illustrated in ST404 (or ST402, if necessary) allows the terminal device 20 to classify, in ST406, a plurality of specific facial expressions substantially without requiring manual input made by the performer during the performance.

Then, in ST408, the terminal device 20 can transmit the learning model (the entire learning model or an algorithm or parameters constituting the learning model) generated by the classifier 121 to the server device 30. Alternatively, in response to a request from a specific user, the server device 30 may transmit learning models (the entire learning models or algorithms or parameters constituting the learning models) acquired from a plurality of users (performers) to the terminal device 20 of the user.

A learning model may be transmitted to the server device 30 at the stage where the terminal device 20 no longer requires manual input from the performer, or a learning model may also be transmitted to the server device 30 at the stage where the terminal device 20 still requires manual input from the performer.

In this manner, a learning model generated by the terminal device 20 of a certain user can be shared by the terminal devices 20 of the other users. Accordingly, in particular, a novice user does not necessarily need to cause the classifier 121 of the terminal device 20 to perform learning from the beginning, thus allowing the classifier 121 to be trained to a desired level (e.g., to a level at which the frequency of manual input is reduced) more quickly.

7. Sharing of Learning Model

Next, a description will be given of an extension to a feature in which a learning model generated by the terminal device 20 of each user (or the server device 30) is shared with the terminal devices 20 of the other users.

First, in step 1, (the classifier 121 of) the terminal device 20 of each user generates a learning model. The terminal device 20 of each user alone uses the generated learning model alone.

In step 2, the server device 30 receives the learning models (or trained parameters included in the learning models) generated by the terminal devices 20 of the plurality of users in step 1 from the terminal devices 20 of the plurality of users. The server device 30 classifies frequently used specific facial expressions using the average values of the trained parameters of the plurality of users to change the entire determination threshold. This can improve the versatility and quality of this service.

In step 3, the learning model generated by the terminal device 20 of a certain user in step 1 is transmitted to, for example, the terminal device 20 of another user, in particular, to the terminal device 20 that is not equipped with the TrueDepth camera (that is equipped with only an ordinary RGB camera), for example, via the server device 30. The terminal device 20 of the other user uses the received learning model.

In step 4, the learning model generated by the terminal device 20 of a certain user in step 1 is transmitted to, for example, the terminal device 20 of another user via the server device 30. Using the received learning model, the terminal device 20 of the other user can cause the virtual character to show any specific facial expression selected from a plurality of specific facial expressions only by inputting only the voice (or voice and image) of the performer during the performance from the second sensor.

In step 5, using the results in step 2 (e.g., via the server device 30), the terminal device of each user can exclude a specific facial expression that is less frequently shown from candidates for training in the classifier 121. That is, the terminal device 20 of each user can use a specific facial expression that is less frequently shown, only when specified by the performer through manual input, not automatically.

In step 6, the server device 30 provides (transmits) learning models of existing animation characters, voice actors, and so forth as preset models to the terminal device 20 of each user for a fee or free of charge.

In step 7, the server device 30 compares the learning model to be provided in step 6 with the learning model generated by the terminal device 20 of each user in step 1, calculates the degree of similarity between them, and transmits information on one or a plurality of learning models having a high degree of similarity among the plurality of learning models to be provided to the terminal device 20 of the user as "recommendation". This allows the terminal device 20 of the user to receive the one or plurality of learning models having a high degree of similarity from the server device 30 for a fee or free of charge.

In step 8, the server device 30 transmits, to the terminal devices 20 of the plurality of users, information on the ranking of the most similar user among the plurality of users by using the degrees of similarity obtained in step 7. This allows the plurality of users to improve their skill and power of expression.

In step 9, the server device 30 can calculate the training difference between users for the same goal from the differences between the results in step 8 and the results in step 6. By calculating the degree of similarity between the training difference and the learning model generated in step 1, the server device 30 can easily transmit, to the terminal device 20 of each user, matching information indicating that "this model is preferred when this kind of facial expression is to be made".

8. Modifications

In one embodiment, a user interface may be set such that if a specific facial expression displayed on the display unit 150 (250) is different from a performer's intention, the performer can instruct the display unit 150 (250) to immediately return to the original facial expression (such as a natural facial expression reflecting the performer's actual facial expression that is captured). In this case, for example, the performer can specify that they "do not wish to use" a specific facial expression selected by the facial expression selection unit 122 (222) in accordance with specific display data from the classifier 121 (221) by tapping on a specific icon, object, or the like displayed on the display unit of the terminal device 20 or the like (or the server device 30 or the studio unit 40), flicking the display unit of the terminal device 20 or the like in a predetermined direction, pressing a predetermined button, keyboard, and the like of the terminal device 20 or the like, and/or the like. In accordance with this, the display unit 150 (250) can display a moving image in which the facial expression of the virtual character changes in a lip-sync and eye-tracking manner with movement of the face of the performer. To achieve this, referring to FIG. 3, the facial expression selection unit 122 (222) can receive input of data designating a natural facial expression ("specific facial expression designation data") from the manual input unit 123 (223) and preferentially execute the fifth process described in "5.(4)" above. Such a user interface is not displayed on the display unit 150 of the terminal device 20 (the terminal device 20 other than the terminal device 20 of the performer) that receives the distribution of the moving image via a moving-image viewing application or the like.

Accordingly, for example, if the display unit 150 (250) displays a moving image of a virtual character with a "kissing face", as exemplified in FIG. 6K, but the performer does not wish to use this face, the performer can perform the operation described above to specify that they do not wish to use this face. This allows the display unit 150 (250) to display a moving image of the virtual character with simply a pouting expression. In this case, the classifier 121 (221) can generate (update) the learning model by, for example, setting a negative reward for the "kissing face". The setting of a negative reward for the "kissing face" is performed using the factors for determining the "kissing face" as a specific facial expression, such as the first data, the second data, the data (such as an MPEG file and a TSV file) related to the face of the performer, the audio data (such as an MPEG file) related to speech and/or singing sounds produced by the performer, and/or the specific facial expression designation data, and the information indicating that the performer "does not wish to use" the selected specific facial expression.

In the various embodiments described above, the terminal device 20, the server device 30, and the studio unit 40 are capable of generating (updating) a learning model by performing learning using the first data, the second data, the data (such as an MPEG file and a TSV file) related to the face of a performer, the audio data (such as an MPEG file) related to speech and/or singing sounds produced by the performer, the specific facial expression designation data, the information indicating that the performer "does not wish to use" the selected specific facial expression, and/or the like. It may not be appropriate for the terminal device 20 to perform such learning due to the limited computing resources and the like of the terminal device 20. It is therefore possible for the terminal device 20 not to perform some or all of such learning, but instead it is possible for the server device 30 to perform such learning at any timing (e.g., at a time when the load is low).

For example, in the first example, the server device 30 can monitor the communication traffic on the server device 30 to detect a timing when the processing load is low, and perform the learning described above at the detected timing. In the second example, the server device 30 can perform the learning described above in a predetermined time period. The predetermined time period described above may be a time period in which the communication traffic is determined to be lower than the communication traffic in any other time period by the server device 30 or any other device. Alternatively, the predetermined time period described above may be a time period set by a person.

To achieve this, the server device 30 needs to receive, from the terminal device 20, the first data, the second data, the data (such as an MPEG file and a TSV file) related to the face of a performer, the audio data (such as an MPEG file) related to speech and/or singing sounds produced by the performer, the specific facial expression designation data, the information indicating that the performer "does not wish to use" the selected specific facial expression, and/or the like.

As described above, the terminal device 20 of a certain performer (e.g., performer B) or the like (or the server device 30 or the studio unit 40) can receive and use a learning model (including teacher data) generated by the terminal device 20 of another performer (e.g., performer A) or the like. In this case, first, the performer B can show a facial expression in accordance with the moving image displayed on the terminal device 20 or the like. The moving image may be the tutorial described above, or a moving image generated by the moving image generation unit 130 (230) and displayed on the display unit 150 (250). Furthermore, based on the facial expression, the terminal device 20 or the like can present the assignment of a certain specific facial expression to the facial expression according to the teacher data of the performer A, via a user interface including a model diagram of the specific facial expression, text, and so forth. Furthermore, the terminal device 20 or the like can query the performer B whether this teacher data can be applied, via a user interface that can provide feedback using buttons, flicks, or the like. The terminal device 20 or the like can determine whether to apply this teacher data, in accordance with the response input by the performer B via the user interface. This allows the performer B to apply the learning model (including teacher data) generated by the performer A, not directly, but after finely adjusting the learning model generated by the performer A on the basis of the response made by the performer B. In another embodiment, the performer B may directly apply the learning model generated by the performer A.

9. Specific Example of Classifier 121

Next, a specific example configuration of the classifier 121 will be described.

It is assumed that, for example, the latest values of float values of 52 points that can be acquired from TrueDepth are acquired as f[0][0] to f[0][51] and that the latest values for the preceding frame (usually at a high speed of about 60 FPS) are held as f[1][0] to f[1][51]. In this case, the distance between the frames can be acquired as $d[n]=sqrt((f[0][n]-f[1][n])^2)$ (n=0 to 51). Let $\Sigma d[n]$ be the sum of the distances between frames in the temporal direction for samples when a certain facial expression is shown by the performer. $\Sigma d[n]$ is sorted according to the size of $\Sigma d[n]$. Accordingly, an index n of feature points with the highest to lowest contributions that vary most greatly in classifying special facial expressions. Specifically, this order depends on the facial expression to be shown, such as near the eyebrows, at the wide angle, at the upper lip, or at the lower lip (this order also depends on the performer, but this tendency does not greatly differ).

The generation of the classifier 121 may be implemented using various methods such as learning based on deep learning, but is basically implemented by the acquisition of this index. For example, not all of the pieces of data for n=0 to 51 of the TrueDepth value, f[0][n], which is acquired in real time during use, is required to determine facial expressions. This is because parts of the body that do not move at all exist. Setting a contribution rate of 1.0 for indexes having many feature quantities to be of interest and 0.0 for indexes that do not contribute at all enables classification to be performed with less computation and data. Setting a negative value for a feature quantity may make it easier to separate it from other facial expressions.

The evaluation function can be expressed by the equation below based on its contribution rate. For example, facial expression A can be expressed by the following equation.

$$EA(t)=a[0]*f[0][0]+a[1]*f[0][1]+ \ldots a[n]*f[0][n]+a[51]*f[0][51],$$

where t denotes the current frame (time).

This evaluation function is present for each of facial expressions A, B, and C in a certain frame t, such as EA(t), EB(t), and EC(t). These evaluation functions can be handled in a controllable manner. For example, the evaluation function for a certain facial expression is assumed to satisfy a predetermined condition. The predetermined condition is a condition that the highest value among the evaluation functions for all facial expressions is output and is greater than or equal to a threshold (e.g., greater than or equal to 0.9). If the process of determining that a facial expression corresponding to an evaluation function that satisfies the predetermined condition has been shown by the performer is executed, the evaluation function can be determined to be handled in a controllable manner. The method for handling the evaluation function in a controllable manner is not limited to the method described above.

For the classification of "pleasure, anger, sorrow, and joy", evaluation functions close to features that are set using a tutorial (scenario) in advance are selected. Specifically, for example, the indexes with high contribution rates a[0] to a[51], which are obtained for each of "pleasure", "anger", "sorrow", and "joy", are made independent so that a combination is achieved in which the elements that needs to be classified (in this case, four types) are completely separable. For example, "pleasure" EA(t) has major change features of five points with indexes n=1, 2, 3, 4, and 5, and "anger" EB(t) also has major change feature indexes 1, 2, 3, and 4. In this case, if the fifth index required by "anger" is 5, the elements are not separable, and more dimensions are required (e.g., "pleasure" n=1, 2, 3, 4, 5, 6, and "anger" n=1, 2, 3, 4, 5, 7). If separation is achieved using the as few dimensions as possible, classification processing can be performed fast with less data, and thus separation for each target facial expression is performed. In the above example, the indexes n=1, 2, 3, 4, and 5 have common features in "pleasure" and "anger", and the square of the difference between the indexes 6 and 7, sqrt(f[0][6]−f[0][7])^2), is the minimum dimension that can separate the two facial expressions. Actually, about five to ten special facial expressions are to be classified, and thus five- to ten-dimensional features are typically required. Applying contribution rates and setting features with negative values enable facial expressions to be separated with fewer dimensions. In this example, the description has been given using the TrueDepth value. It is also possible to handle voice or any other feature quantity in a similar way.

For "deformation/symbol addition", a similar algorithm can be used to classify facial expressions. However, it is necessary to generate an animated image for which timing is more important. It is thus important to extract features that trigger activation of the animated image, rather than differences from neighboring frames, as described above. In addition to acquisition of/d[n] as a sum total during sampling, sampling is divided into three phases: the "start phase", the "middle phase", and the "end phase", and evaluation functions therefor are denoted by EM1(t), EM2(t), and EM3(t), respectively. Attention is focused on a timing that changes like a step function between the start phase and the middle phase or between the middle phase and the end phase. As the evaluation functions for the three phases described above, first, unless the start phase EA1(t) is determined to be greater than or equal to the threshold (e.g., 0.9), it is not necessary to start to determine the evaluation function EA2(t) for the middle phase. If EA1(t) >0.9 is satisfied and then EA2(t)>0.9 is satisfied, the "deformation/symbol addition" effect can be started, and then the effect can be finished if EA3(t)>0.9 is satisfied.

"Event-driven" is a mode in which the evaluation functions described above are used from a system external to the facial expression control unit 120 (220). For example, in a case where a "person with a face looks painful when the person is hit with an object", collision determination by the physics engine is set to the person's body object, with the value s being usually 0. If the value is 1, the target object has collided with the person. In this case, the evaluation function can be expressed as EVf(t)=s*a[0]*f[0][0]+a[1]*f[0][1]+ . . . a[n]*f[0][n]+a[51]*f[0][51], and the value varies only when s=1. Since an animated image actually requires a certain playback time (duration), s is not a binary value such as 1 or 0, but can be implemented with a decay parameter such that s is 1 at the time of collision, such as Δd=0.1, therefrom, and the influence becomes zero in a few seconds.

Examples of the external system other than the physics engine include user interfaces such as keyboards, joypads, and touch panel inputs, expressions of face blushing based on the body temperature or emotions of a character, and cooperation of a normal graphic system with effect parameters, such as dirt and lighting. For example, if a rendering system for the face of a character has a shader parameter that can change the influence of a term that imitates subsurface scattering in skin in real time from 0 to 1, passing the EVf(t) value described above normalized to 0 to 1 enables an expression such as a change in face color to be obtained in response to a specific face. This can be used, for example, to express realistic face blushing or paling, as well as for a controller for the brightness of the eyes, the size of the pupils, and so forth. The method of controlling the state of the face using parameters, rather than preparing facial expressions in advance, is a method of the animation controller, which is commonly used in an animated movie or the like (not in real time), and has an advantage that slider values are not controlled by the UI, but can be controlled in multiple stages based on a person's natural facial features. There is also a range of applications that do not affect the art style which is "realistic or not".

10. Fields to which Technology Disclosed Herein is Applicable

The technology disclosed herein is applicable in at least the following fields:

(1) application services that generate and distribute live and recorded moving images in which virtual characters appear;

(2) application services (such as chat applications, messengers, and e-mail applications) that allow people to communicate using text and avatars (virtual characters); and (3) game services (such as shooting games, romance role-playing games, and role-playing games) that allow people to play as virtual characters whose facial expressions can be changed.

The entire contents of the following two documents are incorporated herein by reference:

"iPhone X iko de animoji wo tsukau (Using animoji on iPhone X and later)", [online], Oct. 24, 2018, Apple Japan Inc., [searched Nov. 12, 2018], the Internet (URL: https://support.apple.com/ja-jp/HT208190); and "kasutamu kyasuto (custom cast)", [online], Oct. 3, 2018, DWANGO Co., Ltd., [searched Nov. 12, 2018], the Internet (URL: https://customcast.jp/).

REFERENCE SIGNS LIST 1 communication system
10 communication network
20 (20A to 20C) terminal device
30 (30A to 30C) server device
40 (40A, 40B) studio unit
100 (200) acquisition unit
102 (202) first sensor
104 (204) second sensor
110 (210) processing unit
120 (220) facial expression control unit
121 (221) classifier
122 (222) facial expression selection unit
123 (223) manual input unit
124 (224) teacher data storage unit
125 (225) user setting adjustment unit
126 (226) user profile storage unit
130 (230) moving image generation unit
140 (240) storage unit
150 (250) display unit
160 (260) communication unit

The invention claimed is:

1. A non-transitory computer readable medium storing computer executable instructions which, when executed by processing circuitry, cause the processing circuitry to:
acquire, from a first sensor, data related to a face of a performer;
provide first data to a classifier, the first data being generated based on the data;
receive, from the classifier, specific facial expression data based on the first data, wherein the specific facial expression data indicates one specific facial expression among a plurality of specific facial expressions, the classifier having selected the one specific facial expression based on any of processing of the first data and a manual input indicating the one specific facial expression, and the manual input is a direction of a swipe operation performed by the performer over a touch panel and an amount of movement of the swipe operation;
select, for display output, a specific facial expression corresponding to the specific facial expression data received from the classifier; and
operate in accordance with an algorithm in which, in a case where the specific facial expression data is received from the classifier in response to the first data, when specific facial expression designation data that designates the one specific facial expression among the plurality of specific facial expressions is acquired from the performer via a user interface in response to the first data, a specific facial expression corresponding to the specific facial expression designation data is selected as the specific facial expression for the display output.

2. The non-transitory computer readable medium according to claim 1, wherein the first data includes data related to an amount of movement of a specific point in the face of the performer.

3. The non-transitory computer readable medium according to claim 2, wherein
the processing circuitry is further caused to acquire, from a second sensor, audio data related to sound of the performer,
the processing circuitry provides second data, that is generated based on the audio data, to the classifier together with the first data, and
the specific facial expression data received by the processing circuitry from the classifier is based on the first data and the second data.

4. The non-transitory computer readable medium according to claim 3, wherein the second data includes data related to volume, sound pressure, speech rate, and/or formant of the audio data of the performer.

5. The non-transitory computer readable medium according to claim 3, wherein the second data includes data related to a word, a word ending, and/or an exclamation, and the data is obtained by the processing circuitry through natural language processing performed on the audio data.

6. The non-transitory computer readable medium according to claim 1, wherein the processing circuitry provides the specific facial expression designation data to the classifier as teacher data for the first data and/or the second data.

7. The non-transitory computer readable medium according to claim 1, wherein the processing circuitry is further caused to receive the manual input, indicating the one specific facial expression, and provide the one specific facial expression to the classifier.

8. The non-transitory computer readable medium according to claim 3, wherein the classifier executes a principal component analysis on the first data and/or the second data to generate a learning model.

9. The non-transitory computer readable medium according to claim 8, wherein when specific facial expression designation data that designates one specific facial expression among the plurality of specific facial expressions is input from the performer to the processing circuitry via a user interface in response to the first data and/or the second data, the classifier executes principal component analysis on the specific facial expression designation data, in addition to the first data and/or the second data, to generate a learning model.

10. The non-transitory computer readable medium according to claim 2, wherein the processing circuitry is further caused to:
control a display to display a script that instructs the performer to show a facial expression related to any one specific facial expression among the plurality of specific facial expressions; and
provide third data, indicating the one specific facial expression, to the classifier as teacher data for the first data and/or the second data in association with the script.

11. The non-transitory computer readable medium according to claim 1, wherein the processing circuitry is further caused to:
receive a learning model from a server via a network; and
provide the learning model to the classifier.

12. The non-transitory computer readable medium according to claim 1, wherein the processing circuitry is further caused to control storage of a learning model generated by the classifier in a memory in association with the performer.

13. The non-transitory computer readable medium according to claim 1, wherein the processing circuitry is further caused to control transmission of the data to a server via a network.

14. The non-transitory computer readable medium according to claim 1, wherein the plurality of specific facial expressions include:
first facial expressions that express emotion,
second facial expressions in which a face shape is unrealistically deformed, and/or
third facial expressions in which a face is given a symbol, a shape, and/or a color.

15. The non-transitory computer readable medium according to claim 14, wherein the first facial expressions that are shown based on a user interface mapped into a language- and culture-independent psychological space, the user interface including a Wheel of Emotions.

16. A display method, comprising:
acquiring, by processing circuitry from a first sensor, data related to a face of a performer;
providing first data to a classifier, the first data being generated based on the data;
receiving, from the classifier, specific facial expression data based on the first data, wherein the specific facial expression data indicates one specific facial expression among a plurality of specific facial expressions, the classifier having selected the one specific facial expression based on any processing of the first data and a manual input indicating the one specific facial expression, and the manual input is a direction of a swipe operation performed by the performer over a touch panel and an amount of movement of the swipe operation;
selecting, by the processing circuitry for display output, a specific facial expression corresponding to the specific facial expression data received from the classifier; and
operating by the processing circuitry in accordance with an algorithm in which, in a case where the specific facial expression data is received from the classifier in response to the first data, when specific facial expression designation data that designates the one specific facial expression among the plurality of specific facial expressions is acquired from the performer via a user interface in response to the first data, a specific facial expression corresponding to the specific facial expression designation data is selected as the specific facial expression for the display output.

17. A device, comprising:
processing circuitry configured to:
acquire, from a first sensor, data related to a face of a performer;
provide first data to a classifier, the first data being generated based on the data;
receive, from the classifier, specific facial expression data based on the first data, wherein the specific facial expression data indicates one specific facial expression among a plurality of specific facial expressions, the classifier having selected the one specific facial expression based on any of processing of the first data and a manual input indicating the one specific facial expression, and the manual input is a direction of a swipe operation performed by the performer over a touch panel and an amount of movement of the swipe operation;
select, for display output, a specific facial expression corresponding to the specific facial expression data received, from the classifier; and
operate in accordance with an algorithm in which in a case where the specific facial expression data is received from the classifier in response to the first data, when specific facial expression designation data that designates the one specific facial expression among the plurality of specific facial expressions is acquired from the performer via a user interface in response to the first data, a specific facial expression corresponding to the specific facial expression designation data is selected as the specific facial expression for the display output.

* * * * *